US009740736B2

United States Patent
Harris et al.

(10) Patent No.: US 9,740,736 B2
(45) Date of Patent: Aug. 22, 2017

(54) LINKING ONTOLOGIES TO EXPAND SUPPORTED LANGUAGE

(71) Applicant: MALUUBA INC., Toronto (CA)

(72) Inventors: Justin Harris, Waterloo (CA); Matthew Dixon, Waterloo (CA); Tareq Ismail, Nepean (CA)

(73) Assignee: Maluuba Inc., Toronto, Ontario (CA)

( * ) Notice: Subject to any disclaimer, the term of this patent is extended or adjusted under 35 U.S.C. 154(b) by 363 days.

(21) Appl. No.: 14/490,293

(22) Filed: Sep. 18, 2014

(65) Prior Publication Data

US 2015/0081711 A1    Mar. 19, 2015

Related U.S. Application Data

(60) Provisional application No. 61/879,812, filed on Sep. 19, 2013.

(51) Int. Cl.
*G06F 17/30* (2006.01)

(52) U.S. Cl.
CPC .... *G06F 17/3043* (2013.01); *G06F 17/30672* (2013.01); *G06F 17/30734* (2013.01); *G06F 17/30755* (2013.01)

(58) Field of Classification Search
CPC ......... G06F 17/30001; G06F 17/30734; G06F 17/30672; G06F 17/30755
USPC ................................................. 707/737, 770
See application file for complete search history.

(56) References Cited

U.S. PATENT DOCUMENTS

| | | | | |
|---|---|---|---|---|
| 7,085,771 | B2 * | 8/2006 | Chung | G06F 17/2785 |
| 2003/0217335 | A1 * | 11/2003 | Chung | G06F 17/2785 715/206 |
| 2005/0154723 | A1 * | 7/2005 | Liang | G06F 17/30109 |
| 2005/0203924 | A1 * | 9/2005 | Rosenberg | G06F 17/30696 |
| 2007/0078889 | A1 * | 4/2007 | Hoskinson | G06F 17/30705 |
| 2009/0012970 | A1 * | 1/2009 | Ziv | G06F 17/30705 |
| 2010/0094874 | A1 * | 4/2010 | Huber | G06F 17/30011 707/740 |
| 2012/0330921 | A1 * | 12/2012 | Ferrucci | G06N 5/02 707/706 |
| 2014/0372364 | A1 * | 12/2014 | Anantharam | G06F 17/30734 706/55 |

(Continued)

*Primary Examiner* — Jean M Corrielus

(57) ABSTRACT

A computer-implemented method, system using at least one computing device, and computer program product are disclosed for linking an ontology provided by a content service with a word expansion ontology. The content service ontology is referred to as a category ontology and the word expansion ontology is referred to herein as a lexical ontology. A user may provide an input such as an input command to an application. The input command is processed by a natural language processing engine to derive the user's intent and to extract relevant entities embodied in the command. The NLP engine may create a composite concept set containing multiple permutations of the concepts (entities extracted) and provide the composite concept set to a concept mapper. The concept mapper applies searches an ontology map and applies one or more scoring operations to determine a best match between the composite concept set and at least one category provided by the category ontology. The content service is searched using the category and the results are displayed to the user.

11 Claims, 11 Drawing Sheets

(56) References Cited

U.S. PATENT DOCUMENTS

2015/0006199 A1* 1/2015 Snider .................. G06F 19/322
                                                    705/3
2015/0160988 A1* 6/2015 Scomparim ............... G06F 7/00
                                                    719/318

* cited by examiner

602 { hammer-->striker-->mechanical device-->mechanism-->device-->instrumentality-->artifact-->whole-->object-->physical entity-->entity 604 { 
hammer-->gunlock-->action-->mechanism-->device-->instrumentality-->artifact-->whole-->object-->physical entity-->entity
hammer-->gunlock-->action-->gun-->weapon-->instrument-->device-->instrumentality-->artifact-->whole-->object-->physical entity-->entity
hammer-->gunlock-->action-->gun-->weapon-->weaponry-->instrument-->device-->instrumentality-->artifact-->whole-->object-->physical entity-->entity
hammer-->gunlock-->gun-->weapon-->instrument-->device-->instrumentality-->artifact-->whole-->object-->physical entity-->entity
hammer-->gunlock-->gun-->weapon-->weaponry-->instrumentality-->artifact-->whole-->object-->physical entity-->entity 606 { hammer-->hand tool-->tool-->implement-->instrumentality-->artifact-->whole-->object-->physical entity-->entity 608 {
hammer-->malleus-->auditory ossicle-->ossicle-->bone-->connective tissue-->tissue-->body part-->part-->thing-->physical entity-->entity
hammer-->malleus-->auditory ossicle-->ossicle-->bone-->connective tissue-->tissue-->body part-->part-->unit-->thing-->physical entity-->entity
hammer-->malleus-->middle ear-->cavity-->structure-->body part-->part-->thing-->physical entity-->entity
hammer-->malleus-->middle ear-->cavity-->structure-->body part-->part-->unit-->thing-->physical entity-->entity 610 {
hammer-->mallet-->drumstick-->stick-->implement-->instrumentality-->artifact-->whole-->object-->physical entity-->entity
hammer-->mallet-->percussion instrument-->musical instrument-->device-->instrumentality-->artifact-->whole-->object-->physical entity-->entity 612 { hammer-->sports equipment-->equipment-->instrumentality-->artifact-->whole-->object-->physical entity-->entity 614 { hammer-->striker-->mechanical device-->mechanism-->device-->instrumentality-->artifact-->whole-->object-->physical entity-->entity 616 {
hammer-->piano action-->action-->mechanism-->device-->instrumentality-->artifact-->whole-->object-->physical entity-->entity
hammer-->piano action-->action-->gun-->weapon-->instrument-->device-->instrumentality-->artifact-->whole-->object-->physical entity-->entity 618 {
hammer-->power tool-->machine-->device-->instrumentality-->artifact-->whole-->object-->physical entity-->entity
hammer-->power tool-->tool-->implement-->instrumentality-->artifact-->whole-->object-->physical entity-->entity 620 {
hammer-->blow-->stroke-->motion-->change-->action-->act-->event-->psychological feature-->abstraction-->entity
hammer-->blow-->fight-->conflict-->group action-->act-->event-->psychological feature-->abstraction-->entity

FIG. 6

Mapping
210

Category A (categoryA)
    entries
    ...
    ##endCategory

Category B (categoryB)
    entries
    ...
    ##endCategory

Category C (categoryC)
    entries
    ...
    ##endCategory

FIG. 7

Mapping 210 skating rinks (skatingrinks)

face-off-->confrontation-->disagreement-->speech act-->act-->event-->psychological feature-->abstraction-->entity
face-off-->beginning-->change of state-->change-->action-->act-->event-->psychological feature-->abstraction-->entity as in a hockey check check-->obstruction-->maneuver-->motion-->change-->action-->act-->event-->psychological feature-->abstraction-->entity slapshot-->shot-->attempt-->activity-->act-->event-->psychological feature-->abstraction-->entity skate-->sports equipment-->equipment-->instrumentality-->artifact-->whole-->object-->physical entity-->entity
skate-->glide-->travel skating-->sport-->diversion-->activity-->act-->event-->psychological feature-->abstraction-->entity
skating-->skate-->glide-->travel ice hockey-->athletic game-->sport-->diversion-->activity-->act-->event-->psychological feature-->abstraction-->entity
ice hockey-->athletic game-->game-->activity-->act-->event-->psychological feature-->abstraction-->entity
ice hockey-->contact sport-->sport-->diversion-->activity-->act-->event-->psychological feature-->abstraction-->entity ringuette is not in WordNet ringuette
ringette rink-->building-->structure-->artifact-->whole-->object-->physical entity-->entity endCategory

FIG. 8

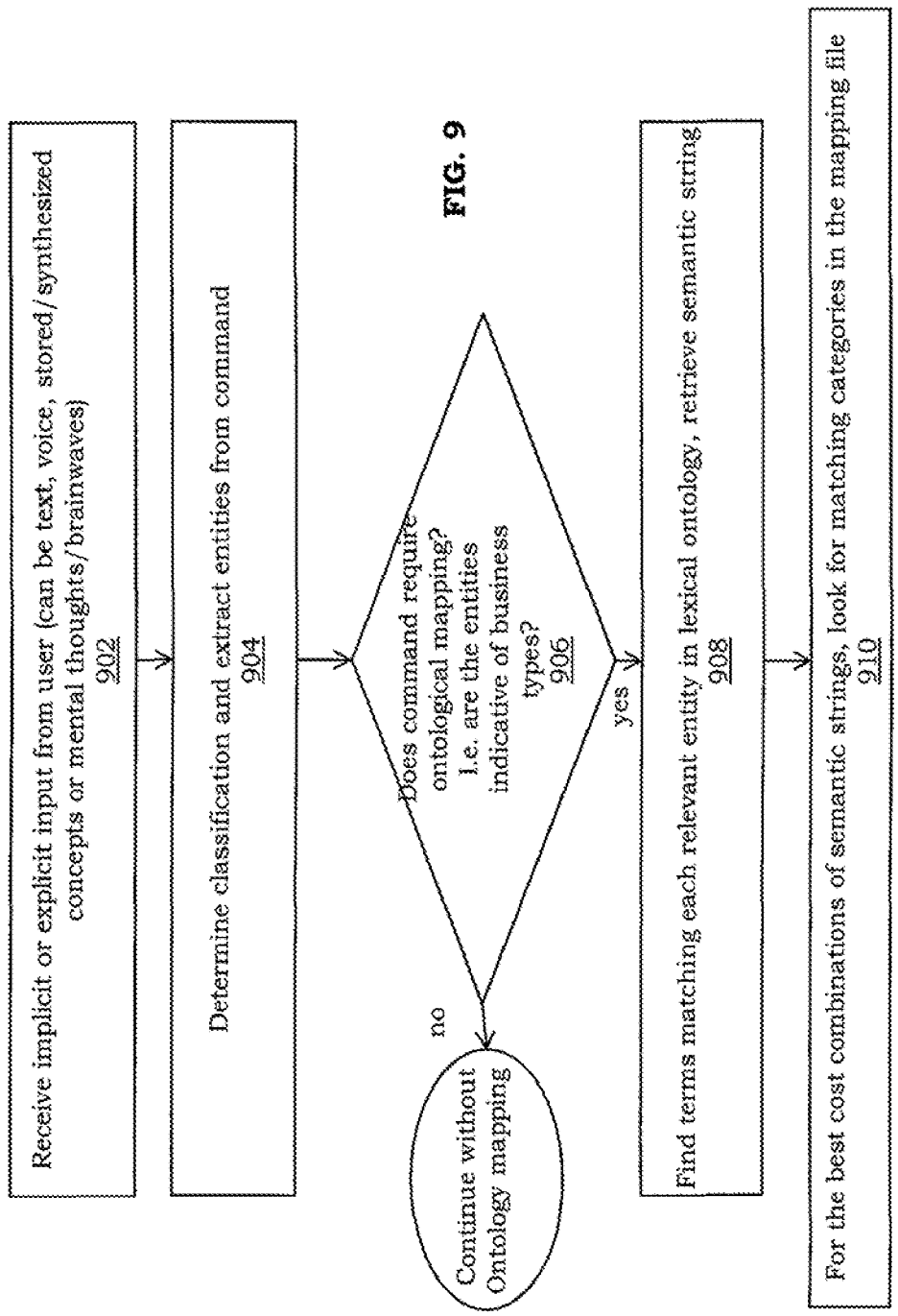

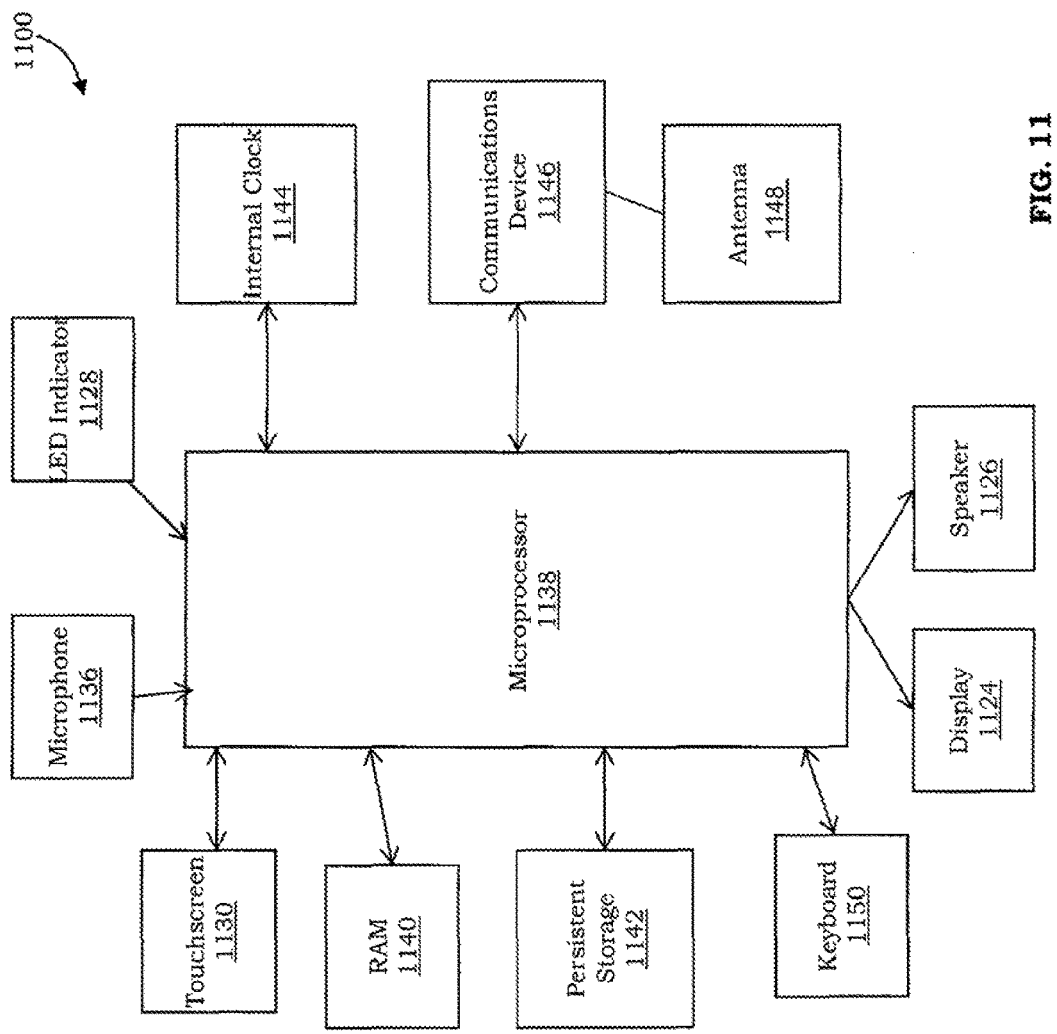

LINKING ONTOLOGIES TO EXPAND SUPPORTED LANGUAGE

RELATED APPLICATIONS

This application claims priority from U.S. Provisional Patent Application No. 61/879,812, filed Sep. 19, 2013, the contents of which are incorporated herein by reference.

FIELD

This invention relates generally to ontologies, and in particular, to mapping concepts from a first ontology to categories in a second ontology, the second ontology being provided by a content service.

BACKGROUND

Ontologies are the structural frameworks for organizing information as a form of knowledge representation about the world or some part of it. Ontologies are commonly used in fields such as artificial intelligence, the Semantic Web, and knowledge management, among others.

One problem with the proliferation of ontologies (and other hierarchical relationship frameworks) is that they are often created by domain experts for a particular domain or computing application, resulting in highly specific ontologies that not very extensible to other purposes. Another deficiency commonly experienced is that ontologies are often limited in vocabulary which may result in synonyms of words in the ontology not being classified or processed correctly by the application implementing the ontology. In short, ontologies provided by the prior art are restricted to the specific words used in the ontology, meaning additional language is not supported by the ontology.

SUMMARY

Embodiments of the invention include methods, systems and computer program products for linking ontologies to perform tasks desired by computing devices.

In one aspect, the invention provides a computer-implemented method for retrieving results on a computing device. A software application on a computing device such as a mobile device receives an input command. The input command may be a voice utterance detected on a microphone, a text string, or a sequence of inputs entered using input devices such as the keyboard and touchscreen. The command is processed to determine a derived intent and to extract at least one entity associated with the task. In some aspects, the command is processed by a natural language processing engine. A first ontology is searched for concepts that match the one or more entities extracted. The first ontology may be an ontology of concepts, the concepts being organized in a hierarchical manner to indicate subsumption relationships. In this specification the first ontology may be referred to as the "lexical ontology". If a match is found in the first ontology, a relationship mapping file is searched to find the association between the selected concept and a second ontology. The second ontology may include a hierarchy of categories and subcategories. Once the category from the second ontology has been identified, the content service is instructed to retrieve results at least partly based on the identified category. The response from the content service, if relevant, may then be displayed on a display of the device.

The invention may be employed in an environment which provides specific functionality, the functionality being categorized into domains. The term "domains" as used herein refers to a field of action and a user may perform one or more tasks related to the field of action. For example, a voice-based personal assistant application on a mobile device that incorporates the invention may be configured to accomplish tasks in a business finder domain, such as locating businesses nearby that have the items that the user would like to find. In such an embodiment, an input command or query such as "Where can I get some snow shovels" is received by a mobile device via a personal assistant application, and the personal assistant application will attempt to find information in response to the query. The application may process the input command and derive the intent and identify a content service configured to provide information, namely, businesses that sell "snow shovels". In the above example query, the application may employ a natural language processing engine (NLP engine) to derive the intent of the input query as finding business information and to extract the relevant entities required to perform the task (i.e. "snow shovels"). Once the task associated with the derived intent user and the relevant entities are extracted from the input command, the application may identify a content service capable of finding the information. Popular business finder content services that may be used by the application include Yelp, Google Places, City Search, and so forth, as well as many others. In some embodiments, the content service may be an internal service available on the mobile device. The content service is generally accessible via standard interface such as an application programming interface (API) and returns a result in a format such as XML or JSON; however, it will be appreciated that content may be provided in many formats and interfaces such as databases, RSS feeds, XML feeds, etc.

The content service will often group items by categories, meaning that certain items may be found by specifying the category of the content service in the interface call with the content service. In the context of the specification, the organization of categories in the content service is referred to as an ontology, and specifically as the "second ontology" or the "category ontology".

The categories specified by the content service to organize information are often different than the entity extracted from the input command, given that the input command can include a variety of words and expressions. In the above example, the input command asked specifically for "snow shovels" which has been extracted as an entity by the NLP engine. Continuing with the example, it can be assumed that the application determines that YELP is a suitable content provider; however the closest category of the content provider is "snow removal". The content provider category is important to identify because it will be used when the application calls an API method to retrieve the information.

The invention includes a mapping file of relationships between a first ontology containing lexical information and a second ontology containing category information. The first ontology may contain a list of synonyms for common words organized in a subsumption framework. An exemplary entry in the first ontology for organizing the entity may be "snow shovels→snow removal equipment→outdoor equipment→consumer good". The characters "→" may be used to indicate a subsumption relationship (i.e. "is a" or "related to" or "is a child of") so that the above entry may be interpreted as meaning "show shovels" is "snow removal equipment" is "outdoor equipment", and so forth. In some embodiments, the hierarchies found in the first ontology generally have more depth than the hierarchy of categories in the second ontology. This occurs because a first ontology is often selected that is configured to recognize a variety of natural language synonyms that may be embodied in an input command, whereas the second ontology is configured to be easily readable and understandable by a person wishing to retrieve content from the content provider.

The invention includes a mapping file of relationships between the first ontology and second ontology, which has the effect of extending the language of the second ontology to include common words and phrases not found in the second ontology. In some embodiment, the mapping of relationships extends the depth of the second ontology several layers, which allows the personal assistant application to receive and process a greater vocabulary than is generally provided by the categories of the content service.

In some aspects, the first ontology (i.e. lexical ontology) may comprise a plurality of entries for the same word, with each entry for the same word describing a unique hierarchical relationship. The word may also be mapped to more than one category of the content service. To resolve the multiple possibilities of candidate concepts and categories, the invention may include ranking operations configured to select the particular mapping (i.e. concept to category) that will provide information. The ranking operations may include scores that represent how likely a particular entry is for a concept where the concepts are ranked by commonness, as well as scores that represent the process of broadening a concept by travelling up the hierarchical string in order to find a match with the categories. In some embodiments, composite concepts may be formed that include several concepts (entities) extracted from the input command. The ranking operations in this situation are configured to associate the composite concept to one particular category (or in some cases, several categories) in the category ontology.

In accordance with an aspect of the specification, there is provided a computer-implemented method for processing a natural language query. The method involves receiving a text representation of the natural language query at a natural language processor; applying at least one pre-processing rule to the query to classify the query; classifying the query using at least one classification statistical model if a match is not with at least one rule; applying one or more post-processing rules to the query in which the classification made by the at least one classification statistical models may be modified; and performing named entity recognition on the query to extract the entities relevant to the classification of the query, wherein the modification applied by the post-processing rules may be selected from the group comprising: overriding the classification decision of the statistical model, restricting the classification of the statistical model.

In accordance with an aspect of the specification, there is provided a natural language processor operating on a computing device for processing a user query received as input to a computing device. The processor includes a classifier for classifying the user query into a category of functionality based on the user's intent; a rule-based pre-processor for classifying the user query into a category of functionality based on the user's intent as embodied in regular expressions with the query; a rule-based post-processor for overriding the classification of the classifier if at least one rule is true; a named entity recognizer for extracting entities from the query to be used as parameters when performing the task intended by the user; and an output module for sending the derived intent, task, and parameters to another component of a distributed system for further processing. The classifier may include a primary classifier for classifying the query into a particular category, and a secondary classifier configured to classify the query as being associated with a particular task. The rule-based post-processor may include at least one rule that compares the query against at least one synset. The rule-based post-processor may include at least one rule that compares the query against at least on regular expression. At least some components of the rule-based pre-processor may reside on a mobile device.

BRIEF DESCRIPTION OF THE DRAWINGS

Reference will now be made, by way of example only, to the accompanying drawings in which:

FIG. 6 is a subset of an exemplary lexical ontology of the invention showing multiple entries for the same word, in accordance with one embodiment;

FIG. 7 is an exemplary mapping relationship in accordance with an embodiment of the invention;

FIG. 8 is an exemplary mapping between specific category and a lexical ontology, in accordance with one embodiment of the invention;

FIG. 9 is a flowchart of general operations (methods) of retrieving information from a content service based on an input command, in accordance with one embodiment of the invention;

FIG. 11 shows an exemplary computing device for use in the natural language processing environment of FIG. 1, according to one embodiment.

DETAILED DESCRIPTION

System Overview

Figure 1:
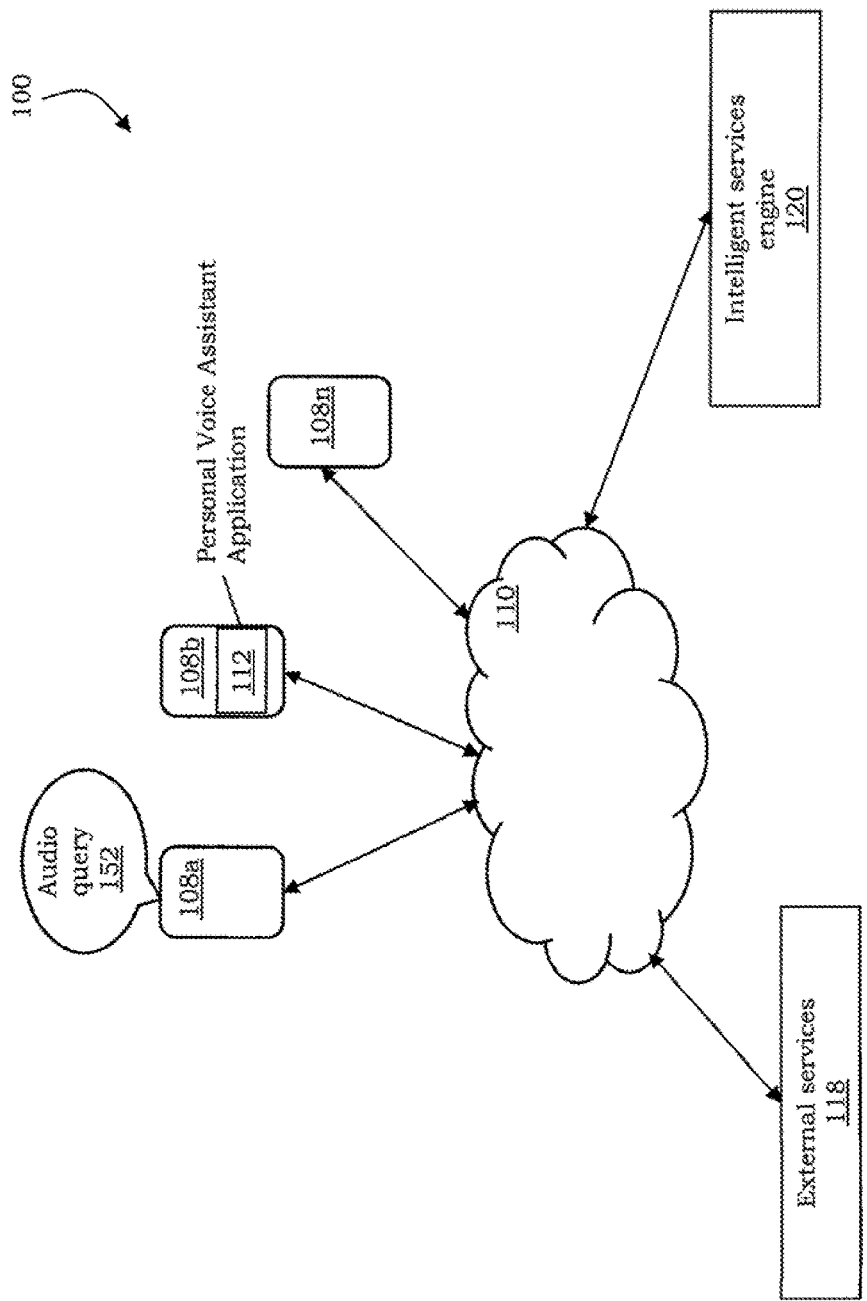
FIG. 1 is a block diagram illustrating a networked natural language processing environment configured to provide functionality to users, in accordance with an embodiment of the invention.

A natural language processing (NLP) environment offers the ability to interact with systems, applications, to complete tasks, and so forth by providing natural language statements to computers or machines. As used herein, the term "input commands" refers to any natural language statement which is intended to instruct an NLP computer application to initiate a response and/or to complete a task. In some embodiments, it is to be appreciated that input commands are ultimately converted to a text string for processing. Accordingly, a person of skill in the art with the benefit of this description would recognize that the input command can be substituted with other forms of input convertible to a text string or substituted with the text string received as input.

Although the invention claimed herein may be integrated into a variety of applications and systems involving a variety of types of computing devices as will be appreciated by one skilled in the art, the invention will be described with reference to an intelligent voice assistant application 112 for use on a mobile device 108. An embodiment of the invention implemented in the context of an NLP application is only one of many possible uses of the invention as claimed.

An example input command 152 is "Book a meeting with Bob at 3 p.m. at the Headquarters". In this example input command 152, the input command 152 is instructing the intelligent services engine 120 (via application 112) to perform a specific task (i.e. book a meeting using a suitable application such as a calendar application) with specific parameters (i.e. "Bob", "3 p.m." and "the Headquarters").

FIG. 1 depicts a high level block diagram of an exemplary natural language processing system environment 100 including one or more natural language processing engines (such NLP engine 206 in FIG. 2) that uses the linked ontology framework of the invention. The exemplary natural language processing environment 100 provides functionality to devices 108a-n for obtaining goods and services from intelligent services engine 120 using input commands 152 or formulating text commands on their respective devices 108a-n. For the purposes of this specification, devices 108a-n (hereinafter referred to as device 108) may include mobile devices such as smartphones, cell phones, personal digital assistants (PDAs), tablet computers, voice assistants in automobiles, etc. as well as more stationary computing devices such as set-top boxes, personal computers, and so forth.

Intelligent services engine 120 (shown in more detail in FIG. 2) provides NLP functionality with application 112 (hereinafter application 112) on mobile device 108. The analysis of the uttered input command 152 may include classifying the input command into one or more domains, extracting entities form the input command 152, as well as one or more rules for extracting other useful information from or processing the input command 152. In one embodiment, the invention includes at least one conditional random field (CRF) for extracting entities from a given input command (i.e. for performing named entity recognition or NER). NER seeks to locate and classify atomic elements (i.e. entities) in text into predefined categories such as the names of persons, organizations, locations, expressions of times, quantities, monetary values, percentages, etc. The NLP engine of the invention may also be configured to extract/identify more complex items such as an entire text message by employing semantic role labeling.

The embodiments of intelligent services engine 120 provided herein include one or more lexical ontologies 212 stored in a database 215 that can be retrieved by during the operation of the intelligent services engine 120. Each of the one or more lexical ontologies 212 include vocabulary that may be supported by the application. The ontology 212 is designed to capture a wide range of vocabulary received at the application 112, vocabulary that may not be supported by a category ontology 218 provided by a content service or otherwise created.

The invention includes an ontology mapping file 210 that associates various elements from the lexical ontology 212 to various elements of the category ontology 218. For example, the ontology mapping file 210 can link elements such as concepts in the lexical ontology 212 with logically related categories in the category ontology 218. By providing an ontology mapping file 210, the invention extends the language that may be used to find items within the category ontology 218. The mapping file 210 may be implemented using one or more object oriented classes or interfaces, and as such, the mapping file 210 implementation may offer a variety of methods to interact with the mapping file 210.

The elements of environment 100 may communicate via one or more networks 110 (e.g. the Internet) so that data, components, modules, services, applications, interfaces etc. that reside on or are partly distributed on one component (such as mobile device 108 or within engine 120) may be accessible by the other components that reside on or are distributed on other computing devices.

Referring to FIG. 11, a block diagram of certain components of an exemplary computing device in accordance with an embodiment is indicated generally by the numeral 1100. Computing device 1100 is representative of any computing device that may be used within natural language processing environment 100 including a mobile device 108, NLP hosting server (not shown), and so forth. The computing device 1100 may be based on a hand-held wireless communication device such as a smartphone with cellular service and/or Wi-Fi, a personal computer with wired and/or wireless Internet connectivity, and/or other computing devices such as personal digital assistants, tablet computers, laptop computers, set-top boxes, and so forth.

Device 1100 may be based on a microcomputer that includes a microprocessor 1138 (also referred to herein as a processor) connected to a random access memory unit (RAM) 1140 and a persistent storage device 1142 that is responsible for various non-volatile storage functions of the device 1100. Operating system software executable by the microprocessor 1138 is stored in the persistent storage device 1142, which in various embodiments is flash memory. It will be appreciated, however, that the operating system software can be stored in other types of memory such as read-only memory (ROM). The microprocessor 1138 receives input from various input devices including the touchscreen 1130, keyboard 1150, communications device 1146, and microphone 1136 (as well as other input devices not shown), and outputs to various output devices including the display 1124, the speaker 1126 and LED indicators 1128 (as well as other output devices not shown). The microprocessor 1138 is also connected to an internal clock 1144.

In various embodiments, the computing device 1100 is a two-way RF communication device (such as mobile device 108) having voice and data communication capabilities. Device 1100 may also include Internet communication capabilities via one or more networks such as cellular networks, satellite networks, Wi-Fi networks and so forth. Two-way RF communication is facilitated by a communications device 1146 that is used to connect to and operate with a data-only network or a complex voice and data network (for example GSM/GPRS, CDMA, EDGE, UMTS or CDMA2000 network, LTE, fourth generation technologies, etc.), via the antenna 1148. Although not shown, a battery provides power to all active elements of the device 1100.

The persistent storage device 1142 also stores a plurality of applications executable by the microprocessor 1138 that enable the computing device 1100 to perform certain operations including the communication operations referred to above. Other applications software is provided including, for example, an email application, a Web browser application, an address book application, a calendar application, a profiles application, and others. Various applications and services on device 1100 may provide application programming interfaces (APis, not shown) for allowing other software modules to access the functionality and/or information available by the APis. As will be discussed later herein, computing device 1100 may provide an application 112 which allows access to functionality provided within NLP environment 100.

Intelligent Services Engine 120

Figure 2:
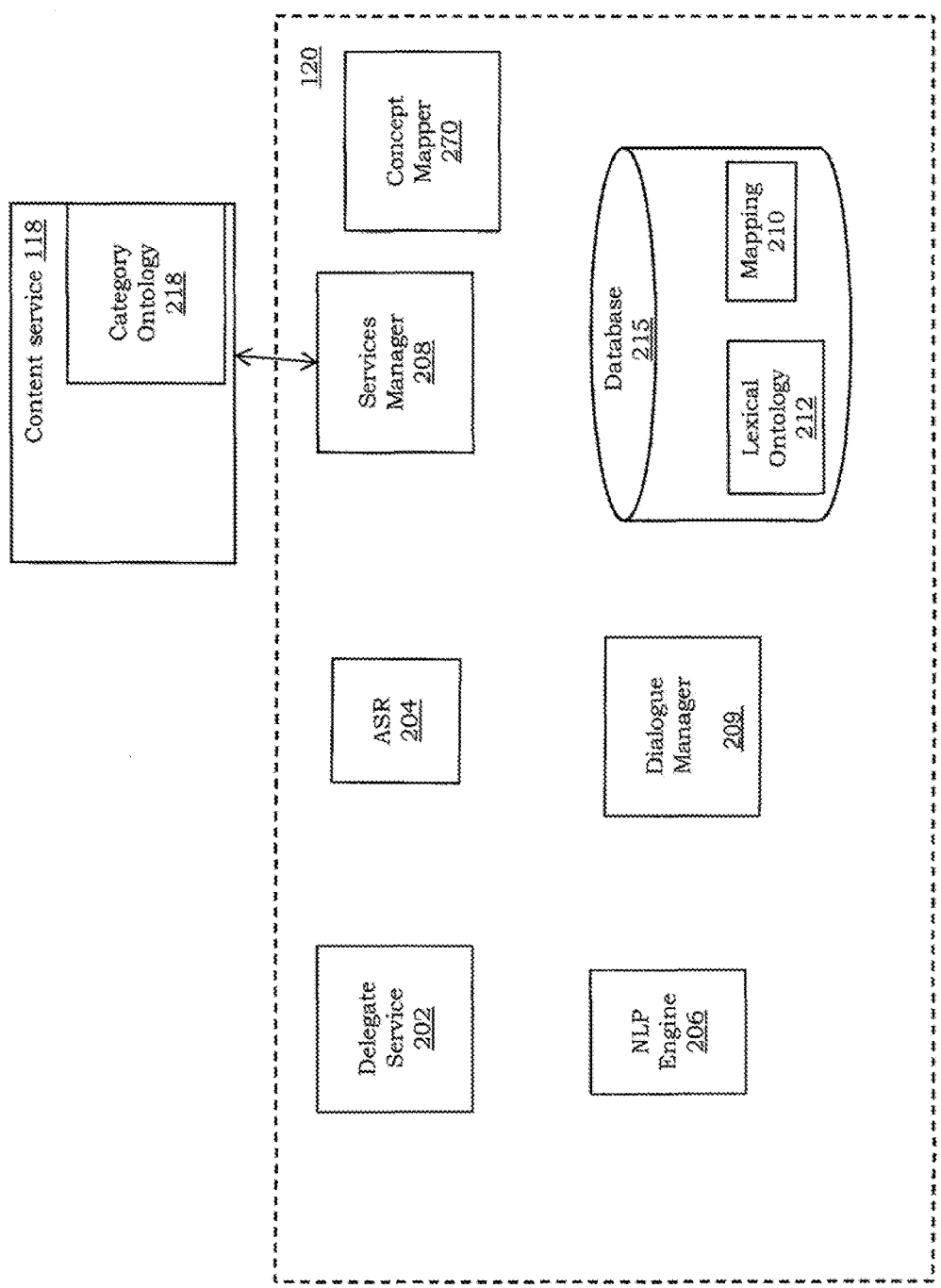
FIG. 2 is a block diagram showing the intelligent services engine of FIG. 1 configured to provide functionality to a user, in accordance with an embodiment of the invention.

Referring to FIG. 2, an intelligent services engine 120 is shown in block diagram form with its constituent components, according to one embodiment. The intelligent services engine 120 may provide voice-based functionality, and is an exemplary implementation of the linking ontology solution provided by the invention. By using an application 112 on computing device 108 (such as a smartphone), an input command such as "Book me a meeting for 8 am", and intelligent services engine 120 will accomplish the task (i.e. book the meeting with the parameters specified). A Delegate Service 202 may be provided to route input commands 152 received from mobile devices 108, manage communication between components (e.g. ASR 204, Services Manager 208, NLP Engine 206, Dialogue Manager 209, etc.), to access database 215, and direct output to the mobile device 108 that requested a particular task. Delegate service 202 may include one or more load balancers to horizontally scale the delegate service 202 (in a service oriented infrastructure manner) according to demand by mobile devices 108. The other components 204, 206, 208, 210, etc. may also include one or more load balancers to manage computing resources according to the demands on intelligent services engine 120 (in a service oriented infrastructure manner).

In one embodiment, input command 152 is received by delegate service 202 and directed to Automatic Speech Recognition module 204 (hereinafter ASR 204) which is configured to convert the raw audio file into a text string that represents the input command 152. The text string output from ASR module 204 may be provided to NLP engine 206 which is configured to derive the intent from the text string representing the input command 152 as well as to perform NER on the text output. NLP engine 206 may apply one or more statistical models (not shown) stored electronically in database 215 and/or in another electronic manner. In one embodiment, each domain has one or more statistical models that are specifically trained for the particular domain using labeled training data. NLP engine 206 classifies the input command 152 into a domain/task pair, and then performs entity extraction on the input command 152 to extract the parameters required to perform the command in accordance with the derived intent. In some embodiments, each domain of functionality (e.g. calendars, reminders, news, sports, etc.) has at least one statistical model for classification and at least one statistical model for entity extraction. The classification models are used to determine which domain and task the input command 152 is referring to, for example, the calendar domain and a "add meeting" task. The entity extraction models are used to extract entities necessary to perform the command, for example, date/time, location, attendees, and so forth.

Once NLP engine 206 has determined the domain/task pair from the input command 152 and has extracted the relevant entities, the results are stored in a data structure (e.g. template object) and provided to a Services Manager 208. The services manager 208 is configured to identify an internal or external service (such as external content services 118) for performing the command in accordance with the derived intent and to instruct the appropriate service 118 to perform the intended command via a predefined interface such as an API. Internal services are those services available on a particular device made available by the operating system or otherwise available on the device 108. Examples of internal services available via an application programming interface (API) are calendar, email, text messaging, phone services, and so forth. Examples of external services (i.e. services provided by third parties via an Internet connection and accessible by an interface such as an API) are stocks, news, weather, knowledge, and so forth.

The service(s) 118 that is called by Services Manager 208 returns a result in known formats such as XML, JSON, etc. which is then passed to a Dialogue Manager 209 for formatting. The dialogue manager 209 may also access predefined dialogue from a repository (such as a dialogue database) for presentation with the results on the mobile device 108. The formatted results screen (with dialogue if applicable) is then communicated by the delegate service 202 to the mobile device 108 that made the request. Application 112 on the mobile device 108 formats and presents the result from delegate service 202 according to the capabilities and settings of the device 108.

Lexical Ontology 212

Figure 5:
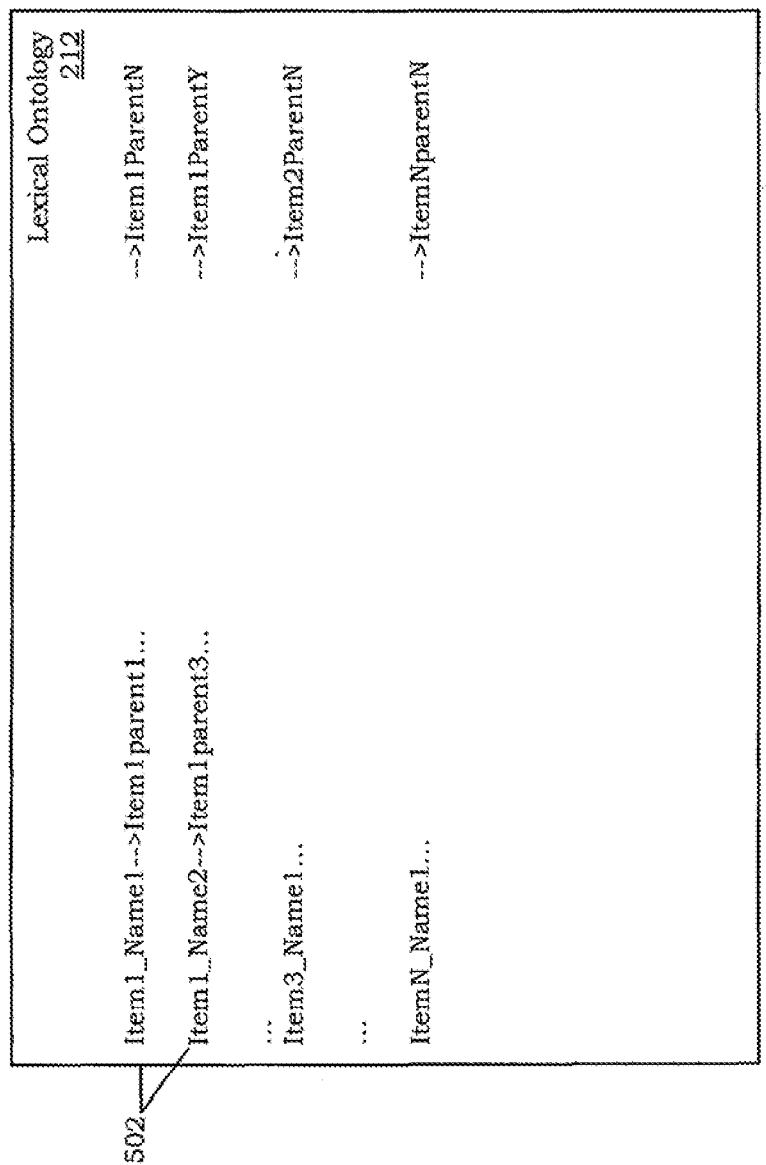
FIG. 5 is an exemplary lexical ontology according to one embodiment of the invention.
Figure 10:
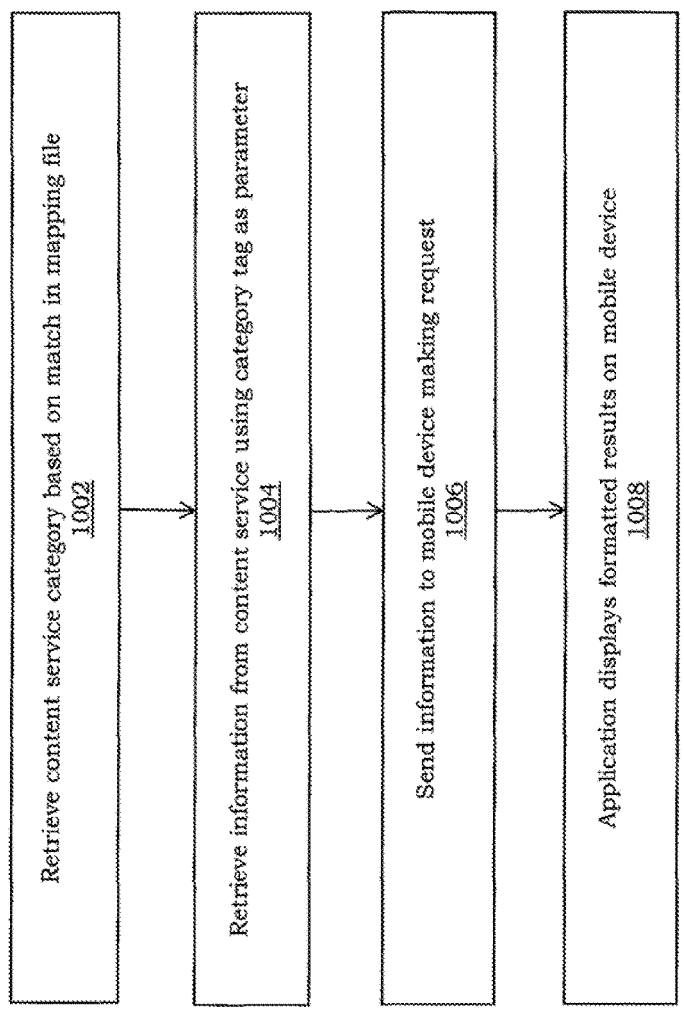
FIG. 10 is a flowchart of general operations (methods) continuing from FIG. 9 according to one embodiment.

Referring next to FIG. 5, an exemplary lexical ontology 212 is illustrated in accordance with one embodiment. Lexical ontology 212 includes a plurality of concepts, a concept being an unambiguous real world idea. For example, the physical item "skate" is a concept that may be used in an input command such as "Where can I get a skate?" A concept may be represented by one or more entries in a lexical ontology, for example:

skate-->sports equipment-->equipment-->instrumentality-->artifact-->whole-->object-->physical entity-->entity The verb "to skate" as in "Where can I skate?" may also be a concept, for example: skate→glide→travel Each concept entry shown in FIG. 5 begins with a child concept and ends with a parent concept. For example, entry 502 beings with a child concept "Item1_Name1" which may represent a word such as "skate" and ends with "Item1ParentN" which may represent a word such as "entity". The entry 502 may include other parents of "Item1" organized in a hierarchy such that "Item1" represents the narrowest concept, and each parent to the right indicated by the character "→" represents a broader concept with Itern1ParentN being the broadest concept in the entry 502. Entry 504 also has "Item1" as the narrowest concept, but the hierarchy described by entry 504 is different than that of entry 502. Several entries may begin with the same word, however, no two entries are identical. Different entries may also begin with different words that are synonyms of each other, for example, "skate" and "ice skate".

The lexical ontology 212 may be employed in an application offering functionality, such as a mobile application 112, that is in communication with an intelligent services engine 120 and one or more external content service 118. Lexical ontology 212 may be used to expand the vocabulary/lexicon of a voice-based system beyond what is available in a category ontology 218, as will be described in more detail herein. As an example, say that category ontology 218 has a category called "grocery" which may be used as a parameter by intelligent services engine 120 when making an API call to retrieve nearby grocery businesses. An input command can include a variety of terms that may be found at a grocery store such as "food", "fruit", "meat", "steak", "milk", etc. The linking ontology solution of the invention allows the input command to use a wide array of words and still access the functionality provided by a content service 118 even though the content service 118 provides a much more narrow set of categories.

Lexical ontology 212 includes a plurality of entries that describe childparent relationships from a bottom level entity (at the far left of the entry) to the top level entity (at the far right of the entry). Each element in an entry is a child (i.e.

is in a subsumption relationship) to every other element to the right within the same entry. The format of the file containing the ontology 212 shown in FIGS. 5 and 6 is merely exemplary, as the ontology 212 may be arranged from left to right, right to left, top to bottom and vice versa, or in any other suitable format that indicates a hierarchical (or other) relationship. In one embodiment, each entry is not necessarily a child of each element to the right, but rather may be generally related to the other elements within the same entry.

Lexical ontology 212 may be an ontology chosen or generated for a specific domain of functionality (e.g. stock trading functionality) or may be a general lexical ontology containing a substantial portion of a human language such as English. WordNet™ is an example ontology that may be used as a general lexical ontology 212 for some implementations of the invention that supports a large portion of the English language.

In some embodiments, the lexical ontology 212 may include multiple entries beginning with the same word. Take the example of the word "hammer", which can have many meanings and may be a verb or a noun. In a noun sense, the word hammer may refer to a tool for hitting nails, a part of a firearm, a device used to strike a bell, a device to be thrown in track and field, and so forth. When such a lexical ontology is used by an application, the application may need to disambiguate between entries having the same root word, as will be discussed further herein.

A subset of an example lexical ontology 212a is shown in FIG. 6 for the word "hammer". In practice, the lexical ontology 212a may contain entries for numerous nouns, however for the sake of this description, only entries for the word "hammer" are shown. The noun groups 602, 604, 606, 608, 610, 612, 614, 616, 618, and 620 all have the word "hammer" as the child of each entry within the group, but the hierarchical relationships of each entry are different as one looks up the chain from the root word "hammer" to the final word at the far right of each entry. For example, in entry 602 "hammer" is a direct child of "striker" which is a child of "mechanical device". In entry 604, however, "hammer" is a direct child of "gunlock" which is a child of "action".

As mentioned herein, lexical ontology 212 may be used to capture a large portion of the language expected to be received by a given application 112 but not supported by a category ontology 218. A mapping file 210 may be provided so that the input command can include any word in the lexical ontology 212 and still obtain the functionality provided by content service, as is further described below.

Category Ontology 218

Figure 3:
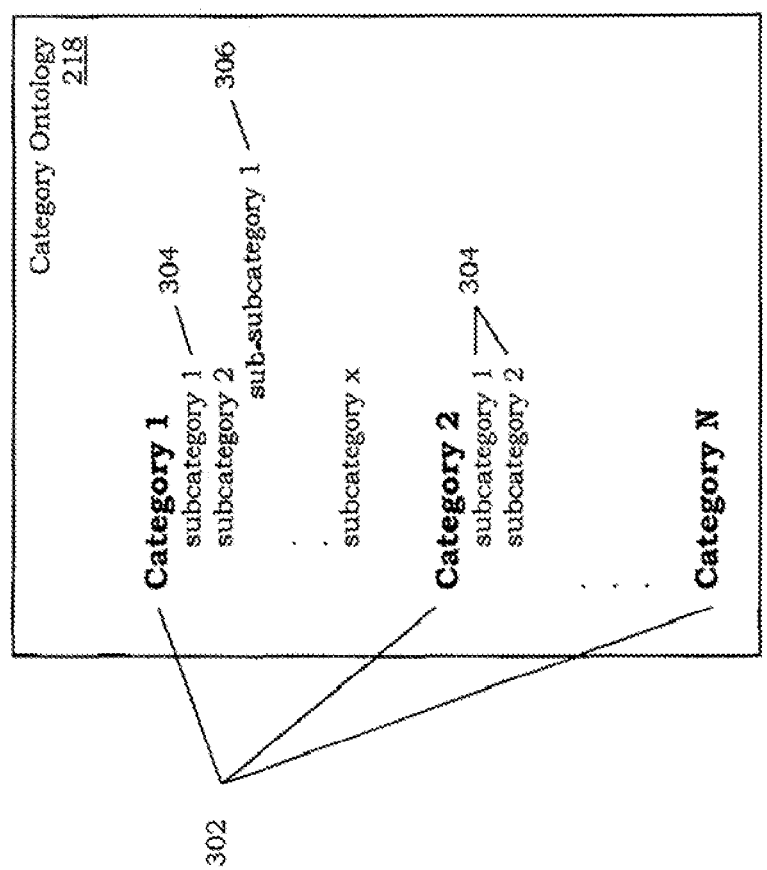
FIG. 3 is an exemplary category ontology, in accordance with an embodiment of the invention.

Reference is next made to FIG. 3 in which a category ontology 218 is shown according to one embodiment. In the present embodiment, the category ontology 218 can be retrieved from a content service 118. Category ontology 218 includes a plurality of parent categories 302, some of which have child categories 304, and sub-child categories 306 which may have additional sub-child categories. Other exemplary category ontologies 218 may have more or less hierarchical levels than is shown in FIG. 3. A category ontology 218 is often created by a content service 118 so that applications may restrict the information provided by the content service 118. Each category 302, 304, and 306 generally has a tag name that may be used as a parameter to one or more calls to the content service in order to restrict the information returned back by the content service.

The category ontology 218 is used by a content provider service 118 to organize the content provider's information so that third parties (such as intelligent services engine 120) are able to retrieve information from the content provider in an organized fashion. In general, each entry in category ontology 218 has a name or tag which is used to restrict information that is returned when application 112 retrieves information from content service 118 using the content service's API.

Figure 4:
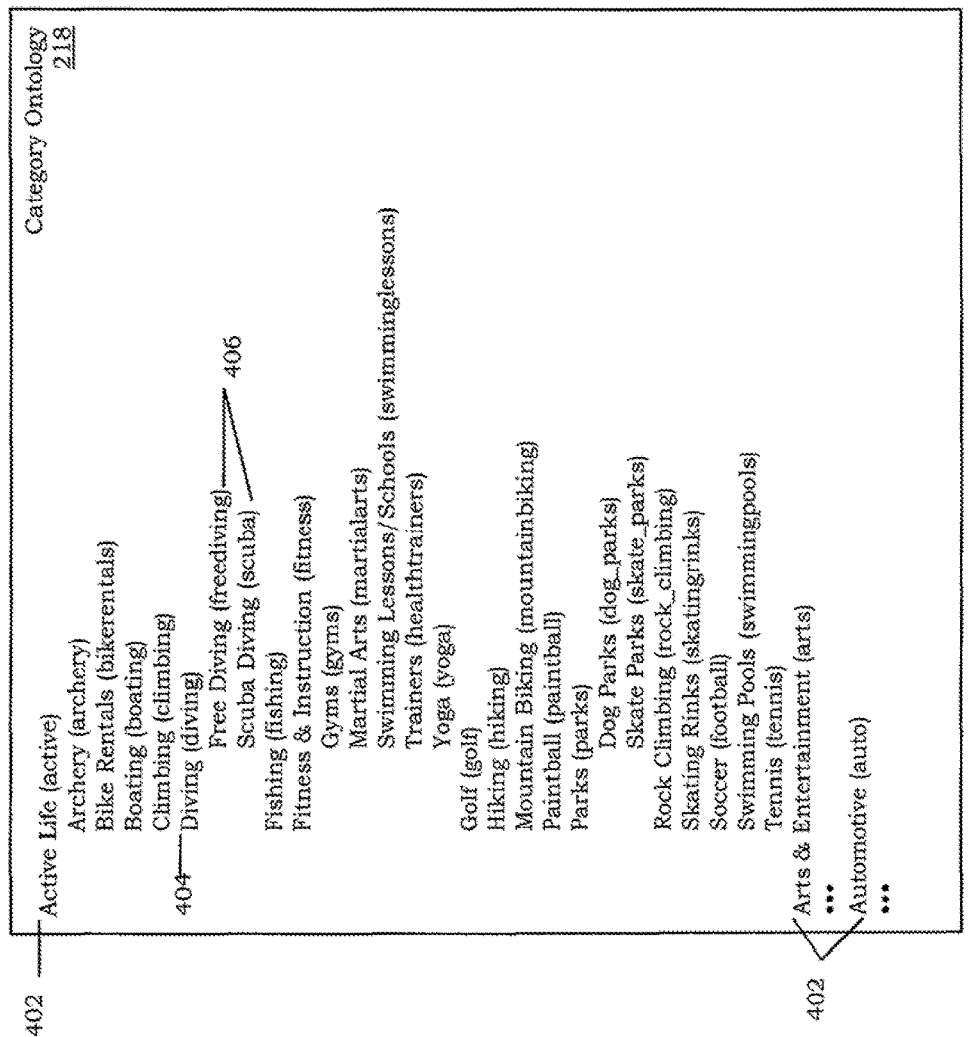
FIG. 4 is an exemplary category ontology for a specific content service, according to an embodiment of the invention.

Part of an exemplary real-world category ontology 218 is illustrated in FIG. 4 which may be used by an application 112. In this example, application 112 is configured to find business information (and perhaps other information as well) for requested from a mobile device 108. An input command 152 such as "I'm looking to buy a hammer nearby" to application 112 which processes the input command to derive the intention as well as any entities that may be useful in accomplishing the task. Category ontology 218 includes top-level categories 402 such as "Active Life", "Arts & Entertainment" and "Home Services" as well as several subcategories (egs. Bike Rentals, Fishing, Skating Rinks, etc.) that belong to the top-level category 402 "Active Life". Some subcategories 404 also contain their own sub-subcategories 406 (eg. Diving contains "Free Diving" and "Scuba Diving"). Any number of hierarchical levels may be used in category ontology 218 depending on a particular implementation. For practical reasons, however, category ontology 218 is generally not as complex or deep as the lexical ontology 212 (in both number of levels and number of entries) because category ontology 218 is designed is meant to be manageable. The parameter name of each category that may be used as a parameter in a particular API call is shown beside its associated category in parentheses.

Continuing with the example input command "I'm looking to buy a hammer nearby", even if the application correctly derives the intention of the input command as finding businesses and extracts the entity "hammer", the category ontology 218 does not have a category with the name "hammer". A human being can quickly discern that a hammer can likely be found at businesses retrieved using the category "Home Services", and subcategory Handyman (not shown). Application 112 implements a lexical ontology 212 and a mapping file 210 to link many thousands of natural language words that may be uttered to a comparatively simple category ontology 218. The present invention substantially enhances the language of category ontology 218 by first applying a query to a lexical ontology 212 and then mapping a particular entry from lexical ontology 212 to a particular category from category ontology 218.

Ontology Mapping File 210

Referring next to FIG. 7, an ontology mapping file 210 is illustrated according to one embodiment of the invention. The ontology mapping file 210 is a mapping of concepts from the lexical ontology 212 to categories in category ontology 218. In general, the ontology mapping file 210 links parent levels concepts (instead of bottom level concepts) from lexical ontology 212 to categories from category ontology 218, allowing for commands to application 112 with a far greater vocabulary than what is available in category ontology 218. By linking parents of concepts from lexical ontology 212 the mapping file 210 is substantially smaller in size than lexical ontology 212. The ontology mapping file 210 may be created programmatically, by a human being, or through a combination of human interaction and computer processing.

FIG. 8 illustrates an exemplary mapping file 210 for the category "skating rinks" having the parameter name of skatingrinks. The category map begins with the title (i.e. "skating rinks") and ends with a predetermined character sequence, in this case "##endCategory". The bottom level entries 802 (i.e. "face-off", "check", "slapshot", and so forth) all map to the category "skating rinks", meaning that in one embodiment, all extracted entities that are identical to the bottom level entries 802 or are children of entries 802 will map to the category "skating rinks" in a relevant content service. The concept mapper 270 may receive one or more entities from NLP engine 206, and retrieve the most relevant category (according to scoring operations described below) by expanding performing word expansion on the entities by referencing the lexical ontology 212, and mapping the concepts from the lexical ontology 212 to category ontology using the mapping file 210.

Flow of Operations

Let's continue with the example command "I'm looking to buy a hammer nearby" 152 received by the application 112 running on mobile device 108 (via a microphone). Application 112 processes the input command 152 and sends the raw audio to NLP engine 206 which derives the intention of the command and extracts any relevant entities. The intention is to find businesses close to the location of a mobile device that sell a "hammer". NLP engine 206 may store the derived intention and entities in a data structure such as a template and direct the template to services manager 208 which is configured to interface with the appropriate external services configured to find information. Services manager 208 identifies an appropriate service 118 which is configured to accomplish the result, and determines if calling the service 118 requires ontological mapping. If the service 118 requires ontological mapping, then services manager 208 retrieves the lexical ontology 212, category ontology 218, and mapping file 210 from memory (egs. Non-volatile memory, database 215, RAM, etc.). The mapping file 210 may be implemented by a mapping service (or software librai-y) that provides a variety of methods for mapping concepts to categories. In one embodiment, the mapping library includes a method to get a category (such as getCagetory( ) based on one or parameters that embody the entities extracted by NLP Engine. The method getCategory (the name being exemplary) may take one or more entities extracted from NLP engine 206 as parameters and may return the category that best matches the entities extracted from the input command 152.

Referring to FIG. 9, at step 902 an implicit or explicit input command is received, an example of which is an input command 152. At step 904, NLP engine 206 classifies the input command 152 into a domain and extracts the relevant entities (may include semantic role labeling). At step 906, a decision is made if the classification requires ontological mapping, and if so, processing continues to step 908. The lexical ontology is then searched to find any concepts that match the extracted entities at step 908. At step 910, for the best combination of semantic strings, matching categories are searched for within mapping file 210. This step may involve one or more scoring operations to determine which category is the optimal match according to the scoring operations. Continuing at step 1004, the content service is searched to retrieve results according to the category matched at step 1002. At step 1006, the results from the content service are sent to the mobile device, and at step 1008, application 112 displays the formatted results.

Categories

As mentioned above, a category has a friendly label and the identifier used by an API (i.e. external service 118). A category may represent one or more real-world items or groups of items. For example, a particular category may be "jazz" with an identifier in parentheses of Uazz) to indicate that the identifier may be used as a parameter in an API call. An example category representing a group of related items is "jazz and blues" Uazzandblues).

Aggregate Concept

An aggregate concept is a placeholder for multiple concepts. An aggregate concept has an unambiguous name/label. An aggregate concept may be used to facilitate the creation of a mapping file 210. Aggregate concepts are not necessary, however, they save space in the mapping file and time for adding Concepts and Composite Concepts to a mapping file.

For example, the aggregate concept buy may be represented as follows:

```
aggregate: buy
purchase-->acquisition-->acquiring-->act-->event-->psychological
feature--> abstraction-->entity
sell-->...
transfer-->...
##end.Aggregate
```

Mapping Concepts to Categories

A concept mapping shows a category and all concepts that map to that category followed by a functional comment "##endCategory" to indicate that the category is finished. Comments are indicated by the string##.

```
skating rinks (skatingrinks)
face-off-->confrontation-->disagreement-->speech act-->act-->event-->
psychological feature-->abstraction-->entity
face-off-->beginning-->change of state-->change-->action-->act-->event-->
psychological feature-->abstraction-->entity
as in a hockey check
check-->obstruction-->maneuver-->motion-->change-->action-->act-->event->
psychological feature-->abstraction-->entity
slapshot-->shot-->attempt-->activity-->act-->event-->psychological feature-->
abstraction-->entity
skate-->sports equipment-->equipment-->instrumentality-->artifact-->whole-->
object-->physical entity-->entity
skate-->glide-->travel
skating-->sport-->diversion-->activity-->act-->event-->psychological feature-->
abstraction-->entity
skating-->skate-->glide-->travel
ice hockey-->athletic game-->sport-->diversion-->activity-->act-->event-->
psychological feature-->abstraction-->en ti ty
ice hockey-->athletic game-->game-->activity-->act-->event-->psychological
feature-->abstraction-->entity
ice hockey-->contact sport-->sport-->diversion-->activity-->act-->event-->
psychological feature-->abstraction-->entity
```

-continued

```
ringuette is not in the lexical ontology so it may be added here by a domain
expert with no parent relationships in case a user utters the word
ringuette
ringette
rink-->building-->structure-->artifact-->whole-->object-->physical entity->
entity
##endCategory
```

Note that words not found in the lexical ontology (e.g. ringuette, ringette) may be added to capture vocabulary that is unsupported by the lexical ontology. This allows localized vocabulary, slang, idioms, etc. to be mapped to a particular category of the content provider 118 as described herein.

Multiple Categories

A concept can map to multiple categories. In some content service 118, an "OR" query may be allowable in particular API methods. As such, the mapping file 210 may have:

```
...
art galleries (galleries)
...
arts-->humanistic discipline-->discipline-->knowledge domain-->content-->cognition-->
psychological feature-->abstraction-->entity
art-->creation-->artifact-->whole-->object-->physical entity-->entity
art-->creation-->activity-->act-->event-->psychological feature-->abstraction-->entity
art-->superior skill-->ability-->cognition-->psychological feature-->abstraction-->entity
artwork-->visual communication-->communication-->abstraction-->entity
artwork-->publication-->work-->product-->creation-->artifact-->whole-->object-->physical
entity-->entity
...
##endCategory
...
arts & crafts (artsandcrafts)
arts-->humanistic discipline-->discipline-->knowledge domain-->content-->cognition-->
psychological feature-->abstraction-->entity
art-->creation-->artifact-->whole-->object-->physical entity-->entity
art-->creation-->activity-->act-->event-->psychological feature-->abstraction-->entity
art-->superior skill-->ability-->cognition-->psychological feature-->abstraction-->entity
artwork-->visual communication-->communication-->abstraction-->entity
artwork-->publication-->work-->product-->creation-->artifact-->whole-->object-->
physical entity-->entity
...
```

Composite Concept

A Composite Concept is an unordered set of concepts and/or aggregate concepts. For example, a composite concept of N concepts may be represented as follows: {concept1, concept2, . . . , conceptN}.

Examples: A possible Composite Concept for the terms "food" and "toiletry" can be made of the concept:

food→solid→matter→physical entity→entity and the concept toiletry→instrumentality→artifact→whole→
object→physical entity→entity to yield the following Composite Concept:

```
{food-->solid-->matter-->physical entity-->entity, toiletry-->
instrumentality-->artifact-->whole-->object-->physical entity-->entity}
```

An example using an aggregate concept could be as follows:

{juvenile→person→causal agent→physical entity→entity, aggregate:clothing}

Aggregate Concept in a Composite Concept Example

An aggregate concept means that every concept and composite concept in the aggregate concept should be used to make new composite concepts. For example, if an aggregate concept file has:

```
aggregate:clothing
fashion-->vogue-->taste-->discrimination-->basic cognitive process-->
process-->cognition-->psychological feature-->abstraction-->entity
wear-->clothing-->consumer goods-->commodity-->artifact-->whole-->
object-->physical entity-->entity
##endAggregate
```

And if the concept mapping file has:

```
children's clothing (childcloth)
{juvenile-->person-->organism-->living thing-->whole-->object-->physical
entity-->entity, aggregate:clothing}
...
```

This means that the concept mapping of children's clothing (childcloth) actually has:

```
{juvenile-->person-->causal agent-->physical entity-->entity, fashion-->
vogue-->taste-->discrimination-->basic cognitive process-->process-->
cognition-->psychological feature-->abstraction-->entity}
{juvenile-->person-->causal agent-->physical entity-->entity, wear-->
clothing-->consumer goods-->commodity-->artifact-->whole-->object-->
physical entity-->entity}
```

Composite Concepts in the Mapping File

A category can have a composite concept as well as standalone concepts. This means that if the entities extracted from a an input command are narrower terms of all of the concepts in a composite concept then the query matches the category of the composite concept.

For example, if the mapping file 210 has:

```
...
grocery (grocery)
{food-->solid-->matter-->physical entity-->entity, toiletry-->
instrumentality-->artifact-->whole-->object-->physical entity-->entity}
...
```

And the input command 152 was: "Where can I get an apple, a toothbrush, and a steak".

NLP engine 206 may have extracted the following entities:

(BUSINESSTYPE, apple), (BUSINESSTYPE, toothbrush), (BUSINESSTYPE, steak)

Where the label BUSINESSTYPE may be a label that refers to the type of entity extracted.

NLP engine 206 may provide the following string to services manager 208 to perform ontological mapping to the categories provided by content service 118:

```
(BUSINESSTYPE, apple-->edible fruit-->produce-->food-->solid-->
matter-->physical entity-->entity ||| ...), (BUSINESSTYPE, toothbrush-->
toiletry-->instrumentality-->artifact-->whole-->object-->physical entity-->
entity ||| ...), (BUSINESSTYPE, steak-->cut-->meat-->food-->solid-->
matter-->physical entity-->entity ||| ...)
```

The string " . . . " indicates that the composite concept for {apple, toothbrush, steak} contains several entries from lexical ontology for each of apple, toothbrush and steak.

Then the above composite concept may be mapped to "grocery", using the scoring example describe herein as applied by the concept mapper 270.

Broadening a Composite Concept

If the composite concept provided is:

```
{
apple-->edible fruit-->produce-->food-->solid-->matter-->physical
entity-->entity, toothbrush-->toiletry-->instrumentality-->artifact-->
whole-->object-->physicalentity-->entity, steak-->cut-->meat-->
food-->solid-->matter-->physical entity-->entity
}
```

Then we can broaden it by making the following Composite Concepts from it by alternating which Concept is broadened, example From going broader on apple→ . . . .

```
{
edible fruit-->produce-->food-->solid-->matter-->physical entity-->entity,
toothbrush-->toiletry-->instrumentality-->artifact-->whole-->object-->
physical entity-->entity, steak-->cut-->meat-->food-->solid-->matter-->
physical entity-->entity
}
```

From going broader on toothbrush→ . . . .

```
{
apple-->edible fruit-->produce-->food-->solid-->matter-->physical
entity-->entity, toiletry-->instrumentality-->artifact-->whole-->object-->
physical entity-->entity, steak-->cut-->meat-->food-->solid-->matter-->
physical entity-->entity
}
```

From going broader on steak→ . . . .

```
{
apple-->edible fruit-->produce-->food-->solid-->matter-->physical
entity-*>entity, toothbrush-->toiletry-->instrumentality-->artifact-->
whole-->object-->physical entity-->entity, cut-->meat-->food-->
solid-->matter-->physical entity-->entity
}
```

Normally, this yield x results, where x is the number of unique Concepts composing a Composite Concept. However, if one of the Concepts cannot be broadened, then we return one less result. E.g.

If the original Composite Concept is:

```
{
apple-->edible fruit-->produce-->food-->solid-->matter-->physical
entity-->entity, entity
}
``` then the concept mapper may only return:

```
{
edible fruit-->produce-->food-->solid-->matter-->physical
entity-->entity, entity
}
``` because it is not possible to go broader on entity.

Scoring Composite Concepts

Composite Concepts may be scored based on how "far" they are believed to be away from the input command. In one embodiment a low score is good, hence scoring becomes a minimization operation. A Scorer is used for calculating the cost or weight associated with a Composite Concept. Scorers may follow a scoring interface. By default, the Concept Map uses may use a specific class in the scoring package. For example, When NLP engine 206 returns the following to services manager 208:

```
(BUSINESSTYPE, apple-->edible frui t-->produce-->food-->solid-->
matter-->physical entity-->entity |||
apple-->edible fruit-->fruit-->reproductive structure-->plant organ-->plant
part-->natural object-->whole-->object-->physical entity-->entity ||| ... ),
(BUSINESSTYPE, toothbrush-->toiletry-->instrumentality-->artifact-->
whole-->object-->physical entity-->entity ||| ... ),
(BUSINESSTYPE, steak-->cut-->meat-->food-->solid-->matter-->physical
entity-->entity ||| ... )
```

The input is converted to a Collection<Collection<String>>. Which may be passed to the map as:

```
[
["apple-->edible fruit-->produce-->food-->solid-->matter-->physical
entity-->entity", "apple-->edible fruit-->fruit-->reproductive structure-->
plant organ-->plant part-->natural object-->whole-->object-->physical
entity-->entity", ... ] '
["toothbrush-->toiletry-->instrumentality-->artifact-->whole-->object-->
physical entity-->entity", ... ], ["steak-->cut-->meat-->food-->solid-->
matter-->physical entity-->entity", ... ],
]
```

In embodiment, two scores may be calculated to determine which concept (or in this example, composite concept) is most likely to represent what the derived intent of the input. The Map's get function may make assumptions about the cost of certain operations on Composite Concepts. For example, the Map may assume that the cost strictly increases when broadening and do not decrease when taking the next candidate for a term.

Cost for Using Next Candidate Concept

In one embodiment, the Map's get function assumes that this cost is greater than or equal to 0. Using a broader Concept costs more than using the next candidate in a Collection<Concept> because the input includes a specific term; if they meant something broader, they should have said the broader term. The Map asks the Scorer how much the order of the Concepts within one inner list matters. For example, when considering possible Composite Concepts to look up in the Map, the Map's get function asks the Scorer how much cost should be associated when using the second apple, apple-->edible fruit-->fruit-->reproductive structure-->plant organ-->plant part-->natural object-->whole-->object-->physical entity-->entity instead of the first one, apple→edible fruit→produce→food→solid→matter→physical entity→entity Cost for Using One Broader Concept in a Composite Concept The Map's get function assumes that this cost is strictly greater than 0. Using a broader Concept should cost more than using the next candidate in a Collection of Concepts because the input includes a specific term, if they meant something broader, they should have said the broader term. Each of those new Composite Concepts will have a score associated with them that is calculated using the score for their origin and the cost that the scorer says it would take to make the broader version of the Composite Concept. For example, if we have the Composite Concept:

{
apple-->edible fruit-->produce-->food-->solid-->matter-->physical entity-->entity,
toothbrush-->toiletry-->instrumentality-->artifact-->whole-->object-->physical entity-->entity,
steak-->cut-->meat-->food-->solid-->matter-->physical entity-->entity
} with score: 0

Then following Composite Concepts can be made from it by alternating which Concept is broadened. From the example above, we would get the following from going broader on apple→ . . . .

{
edible fruit-->produce-->food-->solid-->matter-->physical entity-->entity,
toothbrush-->toiletry-->instrumentality-->artifact-->whole-->object-->physical entity-->entity,
steak-->cut-->meat-->food-->solid-->matter-->physical entity-->entity
} with a score calculated using: the score of more narrow Composite Concept from above (0) and the cost that it takes to build this according to the scorer, the Cost For Using One Broader Concept In A Composite Concept.

From going broader on toothbrush→ . . . .

{
apple-->edible fruit-->produce-->food-->solid-->matter-->physical entity-->entity,
toiletry-->instrumentality-->artifact-->whole-->object-->physical entity-->entity,
steak-->cut-->meat-->food-->solid-->matter-->physical entity-->entity
} with a score calculated using: the score of more narrow Composite Concept from above (0) and the cost that it takes to build this according to the scorer, the Cost For Using One Broader Concept In A Composite Concept.

From going broader on steak→ . . . .

{
apple-->edible fruit-->produce-->food-->solid-->matter-->physical entity-->entity,
toothbrush-->toiletry-->instrumentality-->artifact-->whole-->object-->physical entity-->entity,
cut-->meat-->food-->solid-->matter-->physical entity-->entity
} with a score calculated using: the score of more narrow Composite Concept from above (0) and the cost that it takes to build this according to the scorer, the Cost For Using One Broader Concept In A Composite Concept.

In one embodiment, the mapping implementation adds the original score with the Cost For Using One Broader Concept In A Composite Concept. But other metrics can be used, such as the Harmonic Mean or the average. Although, of course with the Harmonic Mean, you should not start you original Composite Concept with a score of 0.

Score for a Concept

In certain embodiment, a set of Concepts may be penalized. In a mind reading application, for example, we can filter out noise by adding cost/weight to Concepts narrower than certain Concepts. For example, a person may be craving a pizza but people also think about sex a lot, so we can add weight/cost to concepts narrower than "sexual activity". Also, if someone mentions a very obscure concept, it may deserve a lower cost. For example, if someone desires "basket weaving" and "pizza", we should get less of a penalty for going broader and taking different candidates of "basket weaving" because it is such an obscure concept that if included in the input, it is likely very important. Obscure concepts may be identified by how often they are searched for by an aggregation of inputs from various sources, how common the concept is in a natural language such as English, using a variety of these two measures, and other ways.

Full Scoring Example—Three Concepts Mapping to a Category

If the input to the map's get function is (as provided by NLP engine 206 after searching the lexical ontology):

[
[apple-->edible fruit-->produce-->food-->solid-->matter-->physical entity-->entity, apple-->edible fruit-->fruit-->reproductive structure-->plant organ-->plant part-->natural object-->whole-->object-->physical entity-->entity],
[toothbrush-->brush-->implement-->instrumentality-->artifact-->whole-->object-->physical entity-->entity, toothbrush-->toiletry-->instrumentality-->artifact-->whole-->object-->physical entity-->entity],
[steak-->cut-->meat-->food-->solid-->matter-->physical entity-->entity, steak-->dinner-->meal-->entity]
]

The following Composite Concepts may be made from possible combinations of each of the input lists. The cost of using each one is calculated using the metric of choosing a different candidate in one of the input lists.

({steak-->cut-->meat-->food-->solid-->matter-->physical entity-->entity, apple-->edible fruit-->produce-->food-->solid-->matter-->physical entity-->entity, toothbrush-->brush-->implement-->instrumentality-->artifact-->whole-->object-->physical entity-->entity},0.0)
({apple-->edible fruit-->fruit-->reproductive structure-->plant organ-->plant part-->natural object-->whole-->object-->physical entity-->entity, steak-->cut-->meat-->food-->solid-->matter-->physical entity-->entity, toothbrush-->brush-->implement-->instrumentality-->artifact-->whole-->object-->physical entity-->entity},0.5)
({apple-->edible fruit-->produce-->food-->solid-->matter-->physical entity-->entity, steak-->dinner-->meal-->entity, toothbrush-->brush-->implement-->instrumentality-->artifact-->whole-->object-->physical entity-->entity},0.5)
({toothbrush-->toiletry-->instrumentality-->artifact-->whole-->object-->physical entity-->entity, steak-->cut-->meat-->food-->solid-->matter-->physical entity-->entity, apple-->edible fruit-->produce-->food-->solid-->matter-->physical entity-->entity},0.5)
({toothbrush-->toiletry-->instrumentality-->artifact-->whole-->object-->physical entity-->entity, apple-->edible fruit-->produce-->food-->solid-->matter-->physical entity-->entity, steak-->dinner-->meal-->entity}, 1.0)
({apple-->edible fruit-->fruit-->reproductive structure-->plant organ-->plant part-->natural object-->whole-->object-->physical entity-->entity, toothbrush-->toiletry-->instrumentality-->artifact-->whole-->object-->physical entity-->entity, steak-->cut-->meat-->food-->solid-->matter-->physical entity-->entity}, 1.0)
({apple-->edible fruit-->fruit-->reproductive structure-->plan t organ-->plant part-->natural object-->whole-->object-->physical entity-->entity, steak-->dinner-->meal-->entity, toothbrush-->brush-->implement-->instrumentality-->artifact-->whole-->object-->physical entity-->entity}, 1.0)
({apple-->edible fruit-->fruit-->reproductive structure-->plant organ-->plant part-->natural object-->whole-->object-->physical entity-->entity, toothbrush-->toiletry-->instrumentality-->artifact-->whole-->object-->physical entity-->entity, steak-->dinner-->meal-->entity}, 1.5)

If none of those Composite Concepts can be found in the mapping file 210, then they can be broadened. The Composite Concept may be broadened by making new Composite Concepts made of the same Concepts but alternating which of its Concepts we go broader on. The score associated with a broadened Composite Concept is composed of the score of the original Composite Concept and the cost/weight associated with going broader on one of the Concepts that make up a Composite Concept. So by performing multiple iterations of going broader, the following may be provided by the scoring operations:

({cut-->meat-->food-->solid-->matter-->physical entity-->entity,
apple-->edible fruit-->produce-->food-->solid-->matter-->physical entity-->entity,
toothbrush-->brush-->implement-->instrumentality-->artifact-->whole-->object-->physical entity-->entity},
1.0)
({edible fruit-->produce-->food-->solid-->matter-->physical entity-->entity,
steak-->cut-->meat-->food-->solid-->matter-->physical entity-->entity,
toothbrush-->brush-->implement-->instrumentality-->artifact-->whole-->object--> physical entity-->entity},
1.0)
({brush-->implement-->instrumentality-->artifact-->whole-->object-->physical entity-->entity,
steak-->cut-->meat-->food-->solid-->matter-->physical entity-->entity,
apple-->edible fruit-->produce-->food-->solid-->matter-->physical entity-->entity},
1.0)
({cut-->meat-->food-->solid-->matter-->physical entity-->entity,
toothbrush-->toiletry-->instrumentality-->artifact-->whole-->object-->physical entity-->entity,
apple-->edible fruit-->produce-->food-->solid-->matter-->physical entity-->entity},
1.5)
({brush-->implement-->instrumentality-->artifact-->whole-->object-->physical entity-->entity,
apple-->edible fruit-->produce-->food-->solid-->matter-->physical entity--> entity,
steak-->dinner-->meal-->entity},
1.5)
({brush-->implement-->instrumentality-->artifact-->whole-->object-->physical entity-->entity,
apple-->edible fruit-->fruit-->reproductive structure-->plant organ-->plant part-->natural object-->whole-->object-->physical entity-->entity,
steak-->cut-->meat-->food-->solid-->matter-->physical entity-->entity},
1.5)
({edible fruit-->produce-->food-->solid-->matter-->physical entity-->entity,
toothbrush-->toiletry-->instrumentality-->artifact-->whole-->object-->physical entity-->entity,
steak-->cut-->meat-->food-->solid-->matter-->physical entity-->entity},
1.5)
({steak-->cut-->meat-->food-->solid-->matter-->physical entity-->entity,
edible fruit-->fruit-->reproductive structure-->plant organ-->plant part-->natural object--

>whole-->object-->physical entity-->entity,
toothbrush-->brush-->implement-->instrumentality-->artifact-->whole-->object-->physical entity-->entity},
1.5)
({apple-->edible fruit-->produce-->food-->solid-->matter-->physical entity-->entity,
toothbrush-->brush-->implement-->instrumentality-->artifact-->whole-->object-->physical entity-->entity,
dinner-->meal-->entity},
1.5)
({steak-->cut-->meat-->food-->solid-->matter-->physical entity-->entity,
apple-->edible fruit-->produce-->food-->solid-->matter-->physical entity-->entity,
toiletry-->instrumentality-->artifact-->whole-->object-->physical entity-->entity},
1.5)
({edible fruit-->produce-->food-->solid-->matter-->physical entity-->entity,
steak-->dinner-->meal-->entity,
toothbrush-->brush-->implement-->instrumentality-->artifact-->whole-->object-->physical entity-->entity},
1.5)
({apple-->edible fruit-->fruit-->reproductive structure-->plant organ-->plant part-->natural object-->whole-->object-->physical entity-->entity,
cut-->meat-->food-->solid-->matter-->physical entity-->entity,
toothbrush-->brush-->implement-->instrumentality-->artifact-->whole-->object-->physical entity-->entity},
1.5)
({apple-->edible fruit-->produce-->food-->solid-->matter-->physical entity-->entity,
steak-->dinner-->meal-->entity,
toiletry-->instrumentality-->artifact-->whole-->object-->physical entity-->entity},
2.0)
({toothbrush-->toiletry-->instrumentality-->artifact-->whole-->object-->physical entity-->entity,
apple-->edible fruit-->produce-->food-->solid-->matter-->physical entity-->entity,
dinner-->meal-->entity},
2.0)
({meat-->food-->solid-->matter-->physical entity-->entity,
apple-->edible fruit-->produce-->food-->solid-->matter-->physical entity-->entity,
toothbrush-->brush-->implement-->instrumentality-->artifact-->whole-->object-->physical entity-->entity},
2.0)
({produce-->food-->solid-->matter-->physical entity-->entity,
steak-->cut-->meat-->food-->solid-->matter-->physical entity-->entity,
toothbrush-->brush-->implement-->instrumentality-->artifact-->whole-->object-->physical entity-->entity},
2.0)
({edible fruit-->fruit-->reproductive structure-->plant organ-->plant part-->natural object-->whole-->object-->physical entity-->entity,
steak-->dinner-->meal-->entity,
toothbrush-->brush-->implement-->instrumentality-->artifact-->whole-->object-->physical entity-->entity},
2.0)
({apple-->edible fruit-->fruit-->reproductive structure-->plan t organ-->plant part-->natural object-->whole-->object-->physical entity-->entity,
steak-->cut-->meat-->food-->solid-->matter-->physical entity-->entity,
toiletry-->instrumentality-->artifact-->whole-->object-->physical entity-->entity},
2.0)
({edible fruit-->produce-->food-->solid-->matter-->physical entity-->entity,
toothbrush-->toiletry-->instrumentality-->artifact-->whole-->object-->physical entity-->entity,
steak-->dinner-->meal-->entity},
2.0)
({apple-->edible fruit-->fruit-->reproductive structure-->plant organ-->plant part-->natural object-->whole-->object-->physical entity-->entity,
cut-->meat-->food-->solid-->matter-->physical entity-->entity,
toothbrush-->toiletry-->instrumentality-->artifact-->whole-->object-->physical entity-->entity},
2.0)
({toothbrush-->toiletry-->instrumentality-->artifact-->whole-->object-->physical entity-->entity,
steak-->cut-->meat-->food-->solid-->matter-->physical entity-->entity,
edible fruit-->fruit-->reproductive structure-->plant organ-->plant part-->natural object-->whole-->object-->physical entity-->entity},
2.0)
({edible fruit-->produce-->food-->solid-->matter-->physical entity-->entity,
cut-->meat-->food-->solid-->matter-->physical entity-->entity,
toothbrush-->brush-->implement-->instrumentality-->artifact-->whole-->object-->physical entity-->entity},
2.0)
({brush-->implement-->instrumentality-->artifact-->whole-->object-->physical entity-->entity,
apple-->edible fruit-->fruit-->reproductive structure-->plant organ-->plant part-->natural

```
object-->whole-->object-->physical entity-->entity,
steak-->dinner-->meal-->entity},
2.0)
({apple-->edible fruit-->fruit-->reproductive structure-->plant organ-->plant part-->natural
object-->whole-->object-->physical entity-->entity,
toothbrush-->brush-->implement-->instrumentality-->artifact-->whole-->object-->physical
entity-->entity,
dinner-->meal-->entity},
2.0)
({brush-->implement-->instrumentality-->artifact-->whole-->object-->physical entity--
>entity,
cut-->meat-->food-->solid-->matter-->physical entity-->entity,
apple-->edible fruit-->produce-->food-->solid-->matter-->physical entity-->entity},
2.0)
({brush-->implement-->instrumentality-->artifact-->whole-->object-->physical entity--
>entity,
edible fruit-->produce-->food-->solid-->matter-->physical entity-->entity,
steak-->cut-->meat-->food-->solid-->matter-->physical entity-->entity},
2.0)
({steak-->cut-->meat-->food-->solid-->matter-->physical entity-->entity,
apple-->edible fruit-->produce-->food-->solid-->matter-->physical entity-->entity,
implement-->instrumentality-->artifact-->whole-->object-->physical entity-->entity},
2.0)
({apple-->edible fruit-->fruit-->reproductive structure-->plant organ-->plant part-->natural
object-->whole-->object-->physical entity-->entity,
meat-->food-->solid-->matter-->physical entity-->entity,
toothbrush-->brush-->implement-->instrumentality-->artifact-->whole-->object-->physical
entity-->entity},
2.5)
({apple-->edible fruit-->fruit-->reproductive structure-->plant organ-->plant part-->natural
object-->whole-->object-->physical entity-->entity,
steak-->dinner-->meal-->entity,
toiletry-->instrumentality-->artifact-->whole-->object-->physical entity-->entity},
2.5)
({brush-->implement-->instrumentality-->artifact-->whole-->object-->physical entity--
>entity,
apple-->edible fruit-->produce-->food-->solid-->matter-->physical entity-->entity,
dinner-->meal-->entity},
2.5)
...
```

And many more will also be provided. Eventually, since some Concept of "apple" and some Concept of "steak" are both narrower than "food→solid→matter→physical entity→entity" and in one embodiment a Composite Concept cannot have duplicate Concepts, then we get:

```
({toiletry-->instrumentality-->artifact-->whole-->object-->physical
entity-->entity,
food-->solid-->matter-->physical entity-->entity},
7.5)
``` and many more. We might even see:

```
...
({edible fruit-->produce-->food-->solid-->matter-->physical entity-->
entity, cut-->
meat-->food-->solid-->matter-->physical entity-->entity, physical
entity-->entity},
8.5)
({brush-->implement-->instrumentality-->artifact-->whole-->object-->
physical entity-->entity,
solid-->matter-->physical entity-->entity,
entity},
8.5)
```

But the best Composite Concept in a Category with the lower cost/weight was:

```
({toiletry-->instrumentality-->artifact-->whole-->object-->physical
entity-->entity,
food-->solid-->matter-->physical entity-->entity},
7.5)
```

Which maps to the category "grocery" in the mapping file.

Many optimizations are done, such as pruning the search tree when the score seen by continuing down a branch of the search is larger than the current minimum score so far. This is one reason that the cost for broadening is always assumed to be greater than 0, in one embodiment.

Multiple Ambiguous Terms

If the input includes a "hammer" and a "wrench", then an input to the map's get function may be:

```
[
[hammer-->striker-->mechanical device-->mechanism-->device-->instrumentality--
>artifact-->whole-->object-->physical entity-->entity,
hammer-->gunlock-->action-->mechanism-->device-->instrumentality-->artifact-->whole--
>object-->physical entity-->entity,
hammer-->gunlock-->action-->gun-->weapon-->instrument-->device-->instrumentality--
>artifact-->whole-->object-->physical entity-->entity,
```

-continued

```
... ],
[wrench-->injury-->ill health-->pathological state-->physical condition-->condition-->state-
-->attribute-->abstraction-->entity,
wrench-->twist-->movement-->happening-->event-->psychological feature-->abstraction-
-->entity,
wrench-->hand tool-->tool-->implement-->instrumentality-->artifact-->whole-->object--
>physical entity-->entity,
... ]
]
```

The following Composite Concepts may be made from possible combinations of each of the input lists. The cost of using each one is calculated using the metric of choosing a different candidate in one of the input lists.

```
({wrench-->injury-->ill health-->pathological state-->physical condition-->condition--
>state-->attribute-->abstraction-->entity,
hammer-->striker-->mechanical device-->mechanism-->device-->instrumentality--
>artifact-->whole-->object-->physical entity-->entity},
0.0)
({hammer-->gunlock-->action-->mechanism-->device-->instrumentality-->artifact--
>whole-->object-->physical entity-->entity,
wrench-->injury-->ill health-->pathological state-->physical condition-->condition-->state-
-->attribute-->abstraction-->entity},
0.013157894736842105)
({hammer-->gunlock-->action-->gun-->weapon-->instrument-->device-->instrumentality--
>artifact-->whole-->object-->physical entity-->entity,
wrench-->injury-->ill health-->pathological state-->physical condition-->condition-->state-
-->attribute-->abstraction-->entity},
0.02631578947368421)
({wrench-->injury-->ill health-->pathological state-->physical condition-->condition--
>state-->attribute-->abstraction-->entity,
hammer-->gunlock-->action-->gun-->weapon-->weaponry-->instrumentality-->artifact--
>whole-->object-->physical entity-->entity},
0.039473684210526314)
({hammer-->gunlock-->action-->keyboard-->device-->instrumentality-->artifact-->whole--
>object-->physical entity-->entity,
wrench-->injury-->ill health-->pathological state-->physical condition-->condition-->state-
-->attribute-->abstraction-->entity},
0.05263157894736842)
({hammer-->gunlock-->action-->keyboard-->piano-->keyboard instrument-->musical
instrument-->device-->instrumentality-->artifact-->whole-->object-->physical entity--
>entity,
wrench-->injury-->ill health-->pathological state-->physical condition-->condition-->state-
-->attribute-->abstraction-->entity},
0. 06578947368421052)
({wrench-->injury-->ill health-->pathological state-->physical condition-->condition--
>state-->attribute-->abstraction-->entity,
hammer-->gunlock-->action-->keyboard-->piano-->stringed instrument-->musical
instrument-->device-->instrumentality-->artifact-->whole-->object-->physical entity--
>entity},
0.07894736842105263)
( {wrench-->injury-->ill health-->pathological state-->physical condition-->condition--
>state-->attribute-->abstraction-->entity,
hammer-->gunlock-->action-->keyboard-->piano-->percussion instrument-->musical
instrument-->device-->instrumentality-->artifact-->whole-->object-->physical entity--
>entity},
0. 09210526315789473)
({hammer-->gunlock-->action-->keyboard-->organ-->keyboard instrument-->musical
instrument-->device-->instrumentality-->artifact-->whole-->object-->physical entity--
>entity,
wrench-->injury-->ill health-->pathological state-->physical condition-->condition-->state-
-->attribute-->abstraction-->entity},
0.10526315789473684)
({hammer-->gunlock-->action-->keyboard-->organ-->wind instrument-->musical
instrument-->device-->instrumentality-->artifact-->whole-->object-->physical entity--
>entity,
wrench-->injury-->ill health-->pathological state-->physical condition-->condition-->state-
-->attribute-->abstraction-->entity},
0.11842105263157894)
({hammer-->gunlock-->action-->keyboard-->typewriter-->character printer-->printer--
>machine-->device-->instrumentality-->artifact-->whole-->object-->physical entity--
>entity,
wrench-->injury-->ill health-->pathological state-->physical condition-->condition-->state-
-->attribute-->abstraction-->entity},
0.13157894736842105)
({hammer-->gunlock-->action-->keyboard-->computer-->machine-->device--
>instrumentality-->artifact-->whole-->object-->physical entity-->entity,
```

-continued wrench-->injury-->ill health-->pathological state-->physical condition-->condition-->state--
-->attribute-->abstraction-->entity},
0.14473684210526316)
({wrench-->injury-->ill health-->pathological state-->physical condition-->condition--
>state-->attribute-->abstraction-->entity,
hammer-->gunlock-->action-->keyboard-->computer-->platform-->computer system--
>system-->instrumentality-->artifact-->whole-->object-->physical entity-->entity},
0.15789473684210525)
({hammer-->gunlock-->action-->keyboard-->terminal-->electronic equipment--
>equipment-->instrumentality-->artifact-->whole-->object-->physical entity-->entity,
wrench-->injury-->ill health-->pathological state-->physical condition-->condition-->state--
-->attribute-->abstraction-->entity},
0.17105263157894735)
({wrench-->injury-->ill health-->pathological state-->physical condition-->condition--
>state-->attribute-->abstraction-->entity,
hammer-->gunlock-->action-->keyboard-->typesetting machine-->printer-->machine--
>device-->instrumentality-->artifact-->whole-->object-->physical entity-->entity},
0.18421052631578944)
({wrench-->injury-->ill health-->pathological state-->physical condition-->condition--
>state-->attribute-->abstraction-->entity,
hammer-->gunlock-->gun-->weapon-->instrument-->device-->instrumentality-->artifact--
>whole-->object-->physical entity-->entity},
0.19736842105263153)
({wrench-->injury-->ill health-->pathological state-->physical condition-->condition--
>state-->attribute-->abstraction-->entity,
hammer-->gunlock-->gun-->weapon-->weaponry-->instrumentality-->artifact-->whole--
>object-->physical entity-->entity},
0.21052631578947362)
({hammer-->hand tool-->tool-->implement-->instrumentality-->artifact-->whole-->object--
>physical entity-->entity,
wrench-->injury-->ill health-->pathological state-->physical condition-->condition-->state--
-->attribute-->abstraction-->entity},
0.2236842105263157)
({hammer-->malleus-->auditory ossicle-->ossicle-->bone-->connective tissue-->animal
tissue-->tissue-->body part-->part-->thing-->physical entity-->entity,
wrench-->injury-->ill health-->pathological state-->physical condition-->condition-->state--
-->attribute-->abstraction-->entity},
0.2368421052631578)
({hammer-->malleus-->auditory ossicle-->ossicle-->bone-->connective tissue-->animal
tissue-->tissue-->body part-->part-->unit-->thing-->physical entity-->entity,
wrench-->injury-->ill health-->pathological state-->physical condition-->condition-->state--
-->attribute-->abstraction-->entity},
0.2499999999999999)
({hammer-->malleus-->auditory ossicle-->ossicle-->bone-->connective tissue-->animal
tissue-->tissue-->body part-->organism--> living thing-->whole-->object-->physical
entity-->entity,
wrench-->injury-->ill health-->pathological state-->physical condition-->condition-->state--
-->attribute-->abstraction-->entity},
0.263157894736842)
({wrench-->injury-->ill health-->pathological state-->physical condition-->condition--
>state-->attribute-->abstraction-->entity,
hammer-->malleus-->auditory ossicle-->ossicle-->bone-->endoskeleton-->skeletal
system-->system-->body part-->part-->thing-->physical entity-->entity},
0.27631578947368407)
({wrench-->injury-->ill health-->pathological state-->physical condition-->condition--
>state-->attribute-->abstraction-->entity,
hammer-->malleus-->auditory ossicle-->ossicle-->bone-->endoskeleton-->skeletal
system-->system-->body part-->part-->unit-->thing-->physical entity-->entity},
0.28947368421052616)
({hammer-->malleus-->auditory ossicle-->ossicle--> bone-->endoskeleton-->skeletal
system-->system-->body part-->organism--> living thing-->whole-->o bject-->physical
entity-->entity,
wrench-->injury-->ill health-->pathological state-->physical condition-->condition-->state--
-->attribute-->abstraction-->entity},
0.30263157894736825)
({hammer-->malleus-->auditory ossicle-->ossicle--> bone-->endoskeleton-->skeletal
system-->musculoskeletal system-->system-->body part-->part-->thing-->physical entity-
-->entity,
wrench-->injury-->ill health-->pathological state-->physical condition-->condition-->state--
-->attribute-->abstraction-->entity},
0.31578947368421034)
({wrench-->injury-->ill health-->pathological state-->physical condition-->condition--
>state-->attribute-->abstraction-->entity,
hammer-->malleus-->auditory ossicle-->ossicle--> bone-->endoskeleton-->skeletal
system-->musculoskeletal system-->system-->body part-->part-->unit-->thing-->physical
entity-->entity},
0.32894736842105243)
({wrench-->twist-->movement-->happening-->event-->psychological feature--
>abstraction-->entity, hammer-->striker-->mechanical device-->mechanism-->device-->instrumentality-->artifact-->whole-->object-->physical entity-->entity},
0 .3333333333333333)
({wrench-->injury-->ill health-->pathological state-->physical condition-->condition-->state-->attribute-->abstraction-->entity,
hammer-->malleus-->auditory ossicle-->ossicle--> bone-->endoskeleton-->skeletal system-->musculoskeletal system-->system-->body part-->organism-->living thing-->whole-->object-->physical entity-->entity},
0.3421052631578945)
({wrench-->twist-->movement--> happening-->event-->psychological feature-->abstraction-->entity,
hammer-->gunlock-->action-->mechanism-->device-->instrumentality-->artifact-->whole-->object-->physical entity-->entity},
0.3464912280701754)
({wrench-->injury-->ill health-->pathological state-->physical condition-->condition-->state-->attribute-->abstraction-->entity,
hammer-->malleus-->auditory ossicle-->ossicle--> bone-->endoskeleton-->skeletal system-->musculoskeletal system--> body-->natural object-->whole-->object-->physical entity-->entity},
0 .3552631578947366)
({hammer-->gunlock-->action-->gun-->weapon-->instrument-->device-->instrumentality-->artifact-->whole-->object-->physical entity-->entity,
wrench-->twist-->movement-->happening-->event-->psychological feature-->abstraction-->entity},
0.35964912280701755)
({hammer-->malleus-->auditory ossicle-->ossicle-->middle ear-->cavity-->structure--> body part-->part-->thing-->physical entity-->entity,
wrench-->injury-->ill health-->pathological state-->physical condition-->condition-->state-->attribute-->abstraction-->entity},
0.3684210526315787)
({wrench-->twist-->movement--> happening-->event-->psychological feature-->abstraction-->entity,
hammer-->gunlock-->action-->gun-->weapon-->weaponry-->instrumentality-->artifact-->whole-->object-->physical entity-->entity},
0.37280701754385964)
({wrench-->injury-->ill health-->pathological state-->physical condition-->condition-->state-->attribute-->abstraction-->entity,
hammer-->malleus-->auditory ossicle-->ossicle-->middle ear-->cavity-->structure-->body part-->part-->unit-->thing-->physical entity-->entity},
0.3815789473684208)
({wrench-->twist-->movement-->happening-->event-->psychological feature-->abstraction-->entity,
hammer-->gunlock-->action-->keyboard-->device-->instrumentality-->artifact-->whole-->object-->physical entity-->entity},
0.38596491228070173)
({hammer-->malleus-->auditory ossicle-->ossicle-->middle ear-->cavity-->structure-->body part-->organism-->living thing-->whole-->object-->physical entity-->entity,
wrench-->injury-->ill health-->pathological state-->physical condition-->condition-->state-->attribute-->abstraction-->entity},
0 .3947368421052629)
({hammer-->gunlock-->action-->keyboard-->piano-->keyboard instrument-->musical instrument-->device-->instrumentality-->artifact-->whole-->object-->physical entity-->entity,
wrench-->twist-->movement-->happening-->event-->psychological feature-->abstraction-->entity},
0.3991228070175438)
...
({wrench-->hand tool-->tool-->implement-->instrumentality-->artifact-->whole-->object-->physical entity-->entity,
hammer-->striker-->mechanical device-->mechanism-->device-->instrumentality-->artifact-->whole-->object-->physical entity-->entity},
0 .6666666666666666)
({wrench-->injury-->ill health-->pathological state-->physical condition-->condition-->state-->attribute--> abstraction-->entity,
hammer-->mallet-->percussion instrument-->musical instrument-->device-->instrumentality-->artifact-->whole-->object-->physical entity-->entity},
0.6710526315789475)
({wrench-->twist-->movement-->happening-->event-->psychological feature-->abstraction-->entity,
hammer-->malleus-->auditory ossicle-->ossicle--> bone-->endoskeleton-->skeletal system-->musculoskeletal system-->system--> body part-->organism-->living thing-->whole-->object-->physical entity-->entity},
0.6754385964912278)
({wrench-->hand tool-->tool-->implement-->instrumentality-->artifact-->whole-->object-->physical entity-->entity,
hammer-->gunlock-->action-->mechanism-->device-->instrumentality-->artifact-->whole-->object-->physical entity-->entity},
0. 6 798245614035088)
({hammer-->sports equipment-->equipment-->instrumentality-->artifact-->whole-->object-

```
->physical entity-->entity,
wrench-->injury-->ill health-->pathological state-->physical condition-->condition-->state-
-->attribute-->abstraction-->entity},
0.6842105263157896)
({wrench-->twist-->movement--> happening-->event-->psychological feature--
>abstraction-->entity,
hammer-->malleus-->auditory ossicle-->ossicle--> bone-->endoskeleton-->skeletal
system-->musculoskeletal system--> body-->natural object-->whole-->object-->physical
entity-->entity},
0.68859649122807)
({wrench-->hand tool-->tool-->implement-->instrumentality-->artifact-->whole-->object--
>physical entity-->entity,
hammer-->gunlock-->action-->gun-->weapon-->instrument-->device-->instrumentality--
>artifact-->whole-->object-->physical entity-->entity},
0.6929824561403508)
( {wrench-->injury-->ill health-->pathological state-->physical condition-->condition--
>state-->attribute-->abstraction-->entity,
hammer-->striker-->mechanical device-->mechanism-->device-->instrumentality--
>artifact-->whole-->object-->physical entity-->entity},
0.6973684210526317)
...
({hand tool-->tool-->implement-->instrumentality-->artifact-->whole-->object-->physical
entity-->entity,
gunlock-->action-->keyboard-->typesetting machine-->printer-->machine-->device--
>instrumentality-->artifact-->whole-->object-->physical entity-->entity},
2 .8508771929824563)
({wrench-->hand tool-->tool-->implement-->instrumentality-->artifact-->whole-->object--
>physical entity-->entity,
action--> keyboard-->typesetting machine-->printer-->machine-->device--
>instrumentality-->artifact-->whole-->o bject-->physical entity-->entity},
2.8508771929824563)
...
```

Eventually it is found that the best Composite Concept for one of our Categories according to the scoring operations is:

```
({hand tool-->tool-->implement-->instrumentality-->artifact-->whole-->
object-->physical entity-->entity},
2.8903508771929824)
```

As the scoring operations iterate through Composite Concepts in order increasing cost, they must keep checking other Composite Concepts in case they have the same score as the best Composite Concept so far. Eventually the result is:

```
({wrench-->hand tool-->tool-->implement-->instrumentality-->artifact-->
whole-->object-->physical entity-->entity,
tool-->implement-->instrumentality-->artifact-->whole-->object-->physical
entity-->entity},
2.8903508771929824)
``` and then nothing else because nothing else has a lower cost than the current best.

The above scoring examples are merely exemplary and are not meant to limit the scope of the invention as described herein. In some embodiments, the concept mapper 270 may include additional scoring operations that may be selected by a particular application. In other embodiments, additional scoring operations may be implemented as desired to find the optimal matching category.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations or processes described herein may be performed or implemented with one or more hardware or software modules, alone or in combination with other devices. In one embodiment, a software module is implemented with a computer program product comprising computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue from this application. Accordingly, the disclosure of the embodiments of the invention is intended to be illustrative, but not limiting, of the scope of the invention, which is set forth in the following claims.

What is claimed is:

1. A computer-implemented method of linking a collection of concepts to a collection of categories of content in an intelligent services engine, the method comprising:
   identifying at least one concept within the collection of concepts, wherein the at least one concept comprises a top-level word of a hierarchical set of related words;
   retrieving the collection of categories of content, wherein each category of content represents a general type of information offered by a content service;
   identifying, by a computing device, a logical relationship between the top-level word of the at least one concept and at least one category of the collection of categories of content; and
   based on the identified logical relationship, creating a mapping relationship between the at least one concept of the collection of concepts and the at least one category of the collection of categories of content.

2. The computer-implemented method of claim 1, wherein the collection of concepts comprises a first hierarchy, wherein the collection of categories of content comprises a second hierarchy, and wherein the first hierarchy is deeper than the second hierarchy.

3. The computer-implemented method of claim 1, further comprising retrieving information from an external content service associated with the collection of categories of content using the at least one category.

4. A computer-implemented method of retrieving results from a content service, the computer-implemented method comprising:
   receiving a query;
   processing, by a computing device, the query to recognize at least one entity associated with a derived intention of a user;
   accessing a collection of concepts to identify at least one concept related to the at least one entity, wherein the at least one concept of the collection of concepts comprises a top-level entity of a hierarchy of related entities;
   identifying, by a computing device, a mapping relationship between the top-level entity of the at least one concept and at least one category within a collection of categories of content, wherein the collection of categories of content is associated with the content service, and wherein each category of content represents a general type of information offered by the content service;
   selecting the at least one category mapped to the top-level entity;
   requesting information from the content service, the information associated with the derived intention of the user; and
   receiving the information from the content service and displaying the information on a display.

5. The computer-implemented method of claim 4, wherein the query is a text representation of an audio signal received by a microphone.

6. The computer-implemented method of claim 4, wherein the query is a text string received from an input device.

7. A computing device for linking a collection of concepts to a collection of categories of content in an intelligent services engine, the computing device comprising:
   a communications device for communicating with a network;
   a persistent storage device for temporarily storing the collection of concepts and the collection of categories of content, wherein the collection of concepts and the collection of categories of content are retrieved using the communications device; and
   a processor in communication with the communications device and the persistent storage device, the processor configured to:
      identify at least one concept within the collection of concepts, wherein the at least one concept comprises a top-level word of a hierarchical set of related words;
      retrieve the collection of categories of content, wherein each category of content represents a general type of information offered by a content service;
      identify a logical relationship between the top-level word of the at least one concept and at least one category of the collection of categories of content; and
      based on the identified logical relationship, create a mapping relationship between the at least one concept of the collection of concepts and the at least one category of the collection of categories of content.

8. The computing device of claim 7, wherein the collection of concepts comprises a first hierarchy, wherein the collection of categories of content comprises a second hierarchy, and wherein the first hierarchy is deeper than the second hierarchy.

9. The computing device of claim 7, wherein the processor is further configured to:
   retrieve, via the communications device, information from an external content service associated with the collection of categories of content using the at least one category.

10. The computing device of claim 7, further comprising a microphone for receiving an input command.

11. The computing device of claim 7, further comprising a keyboard for receiving an input command.

* * * * *